US011212099B2

(12) United States Patent
Garcia Morchon et al.

(10) Patent No.: US 11,212,099 B2
(45) Date of Patent: Dec. 28, 2021

(54) CRYPTOGRAPHIC DEVICE WITH UPDATABLE SHARED MATRIX

(71) Applicant: KONINKLIJKE PHILIPS N.V., Eindhoven (NL)

(72) Inventors: Oscar Garcia Morchon, Eindhoven (NL); Ludovicus Marinus Gerardus Maria Tolhuizen, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 78 days.

(21) Appl. No.: 16/756,137

(22) PCT Filed: Oct. 12, 2018

(86) PCT No.: PCT/EP2018/077823
§ 371 (c)(1),
(2) Date: Apr. 15, 2020

(87) PCT Pub. No.: WO2019/076737
PCT Pub. Date: Apr. 25, 2019

(65) Prior Publication Data
US 2020/0304305 A1    Sep. 24, 2020

(30) Foreign Application Priority Data
Oct. 17, 2017   (EP) .................................... 17196926

(51) Int. Cl.
*H04L 9/30*   (2006.01)
*G06F 7/58*   (2006.01)
*H04L 9/08*   (2006.01)
*H04L 29/06*   (2006.01)

(52) U.S. Cl.
CPC ............ *H04L 9/3093* (2013.01); *G06F 7/582* (2013.01); *H04L 9/0825* (2013.01); *H04L 63/061* (2013.01); *H04L 2209/08* (2013.01); *H04L 2209/12* (2013.01)

(58) Field of Classification Search
CPC ... H04L 9/0825; H04L 9/0841; H04L 9/3093; H04L 2209/08; H04L 2209/12; H04L 63/061; G06F 7/582
See application file for complete search history.

(56) References Cited

U.S. PATENT DOCUMENTS 9,698,986 B1 *   7/2017   Gutoski ............... H04L 9/0816
10,097,351 B1 *  10/2018  Kelly .................... H04L 9/0662
2012/0166809 A1   6/2012  Barton et al.
2015/0067336 A1 * 3/2015  Ding ........................ H04L 9/14
                                                          713/171
2019/0386828 A1  12/2019  Garcia Morchon

FOREIGN PATENT DOCUMENTS

EP      3373505 A1      9/2018
WO   2015184991 A1     12/2015

OTHER PUBLICATIONS

Ludo Tolhuizen et al "Improved key reconciliation method", Cryptology ePrint Archive, Report (2017).
J. Bos et al, "Frodo: Take off the ring! Practical, Quantum-Secure Key Exchange from LWE", Cryptology ePrint Archive, Report (2016).
E. Alkim et al, "Post-quantum key exchange—a new hope", Cryptology ePrint Archive, Report (2015).
E. Alim et al, "NewHope without reconciliation", Cryptology ePrint Archive, Report (2016).
J. Bos et al, "CRYSTALS—Kyber: a CCA-secure module-lattice-based KEM", Cryptology ePrint Archive, Report (2017).
S. Bhattacharya et al, "spKEX: an optimized lattice-based key exchange", Cryptology ePrint Archive, Report (2017).
International Search Report from PCT/EP2018/077823 dated Jan. 17, 2019.
Hayo Baan et al: "Round2: KEM and PKE based on GLWR", International Association for Cryptologie Research, Dec. 5, 2017.
Markku-Juhani 0 Saarinen: "HILA5: On Reliability, Reconciliation, and Error Correction for Ring-LWE Encryption", Iacr, International Association for Cryptologic Research vol. 20170924:195235 Jul. 5, 2017 (Jul. 5, 2017), pp. 1-22.
Joppe Bos et al: "Frodo Take off the Ring . . . ", Computer and Communications Security, ACM, 2 Penn Plaza, Suite 701 New York NY 10121-0701 USA, Oct. 24, 2016 (Oct. 24, 2016), pp. 1006-1018.
Ludo Tolhuizen et al: "Improved key-reconciliation method", International Association for Cryptologic Research,, vol. 2 May 2, 2017 (May 2, 2017), pp. 1-5.
Garcia Morchon "NIST Submission Framework for Lattice-Based KEM and PKE" Nov. 30, 2017.

* cited by examiner

*Primary Examiner* — Minh Dinh

(57) ABSTRACT

Some embodiments relate to an electronic network node (110) configured for a cryptographic operation. The network node obtains a shared matrix (A) by selecting integers, polynomials, and/or polynomial-coefficients from a shared pool, the shared pool being shared with the second network node, wherein the selecting is done according to one or more selection functions.

24 Claims, 4 Drawing Sheets

CRYPTOGRAPHIC DEVICE WITH UPDATABLE SHARED MATRIX

CROSS-REFERENCE TO PRIOR APPLICATIONS

This application is the U.S. National Phase application under 35 U.S.C. § 371 of International Application No. PCT/EP2018/077823, filed on Oct. 12, 2018, which claims the benefit of EP Patent Application No. EP 17196926.4, filed on Oct. 17 2017. These applications are hereby incorporated by reference herein.

FIELD OF THE INVENTION

The invention relates to a network node configured for a cryptographic operation, a cryptographic operation method, and a computer readable medium.

BACKGROUND OF THE INVENTION

In cryptography, a key-agreement protocol is a protocol whereby two or more parties that may not yet share a common key can agree on such a key. Preferably, both parties can influence the outcome so that neither party can force the choice of key. An attacker who eavesdrops on all communication between the two parties should learn nothing about the key. Yet, while the attacker who sees the same communication learns nothing or little, the parties themselves can derive a shared key. Key agreement protocols are useful, e.g., to secure communication, e.g., to encrypt and/or authenticate messages between the parties.

In order to facilitate secure communication among parties, key agreement protocols are sometimes further subdivided into cryptographic key-exchange (KEX) and cryptographic key-encapsulation (KEM) schemes. Cryptographic key-encapsulation (KEM) schemes use asymmetric cryptography to establish a shared secret among two parties, using a publicly known (e.g., public-key) and a secretly-owned (e.g., secret-key) value for each party.

KEX schemes involve the exchange of public-keys by each party, that is then independently used by the other party along with their own secret-key to calculate the common shared secret. A well-known example of a KEX scheme is the Diffie-Hellman key-exchange, mentioned above, whose security is based on solving the discrete logarithm problem. An interesting feature of some KEX schemes is that the actual final, shared secret is never exchanged between the parties, not even in encrypted form, but is calculated independently by the two parties at each end. This results in a desirable feature known as forward-secrecy, which ensures that even the compromise of a party's long-term secret-key by an attacker in the future would not compromise the secrecy of encrypted message exchanged in the past.

KEM schemes establish a shared secret between two entities or parties using asymmetric cryptography by one party, usually the initiator of the communication, to encrypt (using the other party's public-key) and transmit a shared secret to the other party, known as the responder, who can then decrypt it (using her secret-key) and then use it for securely communicating with the initiator party. KEM schemes can only achieve forward-secrecy if it is ephemeral. Otherwise, any attacker that compromises a party's secret-key for a past session and has recorded all messages exchanged between the parties in that session can recover the shared secret for that particular session.

Due to increasing security needs in the Internet of Things, key-exchange schemes need to also achieve high efficiency (i.e., minimal amount of communication or bandwidth requirements) while also remaining secure, against classical as well as quantum-capable adversaries.

Recent advances indicate that quantum-computers may be feasible in a few years. Perhaps as soon as within some 5-10 years. As soon as a quantum-computer is available, most existing public-key cryptographic schemes will become unsecure since the underlying problems, on which they are based, can efficiently be solved with a quantum computer. Therefore, it is very important to design quantum-resistant public-key algorithms, i.e., public-key algorithms that cannot be broken by means of a quantum-computer.

There are several classes of quantum-resistant algorithms: lattice-based, code-based, isogeny-based, etc. In this document, we deal with quantum-resistant algorithms based on lattices. Lattice based cryptographic systems are an active area of research in which many different types of systems have been proposed. For example, the lattice may be defined in terms of a matrix of numbers, e.g., elements of some finite field, or using a polynomial, etc. The type of cryptographic operation can also vary. For example, lattice based cryptography is available for: Key encapsulation (KEX), Key exchange (KEM), Public key encryption (PKE), digital signatures, etc. Examples of those schemes are:

LWE-based KEX such as Frodo

RLWE-based KEX and CPA-KEM Newhope and NewHopeSimple.

Module-lattice-based CPA-PKE, CPA-KEM and CCA-KEM as Kyber

LWR-based KEX as spKEX

Each of the above schemes share some common characteristics. Each of them requires a shared matrix A, that is at some point shared with another node. The shared matrix A may be filed with integers modulo a modulus q, or with polynomials modulo a modulus q and a reduction polynomial f. The inventors have realized that is advisable not to use the shared matrix too often. For example, in case of KEX protocols, a possible use-case would be to use a particular share matrix only once. However, as the size of matrix could, e.g., be 600 by 600, and the modulus q might be 14 bits, then amount of data in the shared matrix could be significant. Regardless whether the matrix is communicated or generated at both sides this is an important overhead. Especially for a server that maintains many connections, e.g., with multiple clients, this overhead could be very large. There is thus a need to replace a shared matrix without incurring a large overhead.

REFERENCES

[1] "Device and method sharing a matrix for use in a cryptographic protocol", European filing op 6 Mar. 2017, application Ser. No. 17/159,2967.

[2] Ludo Tolhuizen, Ronald Rietman and Oscar Garcia-Morchon, "Improved key reconciliation method", Cryptology ePrint Archive, Report 2017/295, https://eprint.iacr.org/2017/295

[3] (Frodo): J. Bos et al, "Frodo: Take off the ring! Practical, Quantum-Secure Key Exchange from LWE", Cryptology ePrint Archive, Report 2016/659, https://eprint.iacr.org/2016/659

[4] (New Hope): E. Alkim et al, "Post-quantum key exchange—a new hope", Cryptology ePrint Archive, Report 2015/192, https://eprint.iacr.org/2015/1092

[5] (New Hope Simple): E. Alim et al, "NewHope without reconciliation", Cryptology ePrint Archive, Report 2016/1157, https://eprint.iacr.org/2016/1157

[6] (Kyber): J. Bos et al, "CRYSTALS—Kyber: a CCA-secure module-lattice-based KEM", Cryptology ePrint Archive, Report 2017/634, https://eprint.iacr.org/2017/634

[7] (spKEX): S. Bhattacharya et al, "spKEX: an optimized lattice-based key exchange", Cryptology ePrint Archive, Report 2017/709, https://eprint.iacr.org/2017/709

Each one of references [1] to [7] is included herein by reference.

SUMMARY OF THE INVENTION

A network node is proposed which implements a cryptographic operation which relies on the hardness of a lattice problem and which employs a shared matrix. As pointed out in the background, there are many such cryptographic operations. The inventors realized that overhead could be reduced by introducing a shared pool. Rather than generating the shared matrix directly, the first and second node first share a shared pool. The pool comprises multiple integers or polynomials, just as the shared matrix does, or the pool comprises multiple coefficients which may be used for polynomials. In an embodiment, the shared pool is not changed between the two nodes, and remains the same, or at least remains the same over multiple executions of the cryptographic operation. However, for each cryptographic operation a new shared matrix is constructed from the shared pool. This done by selecting functions that map elements of the shared pool to entries in the shared matrix, or that map coefficients of the shared pool to coefficient of the shared matrix. The selecting functions depend on the index in the shared pool or the index in the shared matrix, but interestingly also depend on a selection parameter. A selection parameter changes the way the entries of the shared matrix are selected from the shared pool. The inventors realized that varying selection functions requires relatively little overhead, and moreover such function can be easy to compute. For example, a selection functions may be a permutation which depends on the selection parameter which permutes the shared pool, or a part thereof and assigns it to a subset of the matrix, or to the coefficients. The matrix A can be partitioned in a number of such subsets. Each subset may be obtained from the same shared pool, or each subset may be obtained from a part of the shared pool. Yet, the parts of the shared pool that are mapped to the subsets of the shared matrix can overlap, even significantly.

As a result, the shared pool need contain significantly less data than the shared matrix. This means that fewer data needs to be kept in storage, but also that construction of the shared matrix can be significantly faster. For example, consider as a comparison a situation in which the shared matrix is generated from a seed by a (pseudo) random function. This requires a relatively large number of random function operations. However, by first generation a shared pool, which may also be done from a seed, much fewer random function applications are needed. As some of the random number function application are replaced by the selection functions, which may, e.g., be implemented with a less resource demanding permutations, the time to generate the shared matrix is reduced. This is even of advantage in cryptographic operations which do use a shared matrix but do not required that it is often replaced.

As pointed out above, there are quite a number of cryptographic operations which use a shared matrix. Some of these use polynomials, some of which use integers. The inventors realized that it is possible to describe many such schemes in a way which parametrizes large classes of lattice based cryptography. For example, such a description may use only a few input parameters, which change the nature of the underlying cryptography: a difficulty parameter (d), and a structure parameter (n) which together suffice to specify the type of cryptography that is used. Both the difficulty parameter (d), and a structure parameter (n) are positive integers. By increasing the difficulty parameter, the structure of the problem stays the same, but larger, and thus harder instantiations are used. A difficulty parameter is sometimes referred to as a security parameter. In an embodiment, the difficulty parameter is related to the dimension of the underlying lattice. A larger value of the difficulty parameter leads to a higher dimension of the underlying lattice, and thus to a harder problem for an attacker to solve. The structure parameter is related to the amount of algebraic structure in the system. A higher value of the structure parameter implies more algebraic structure. It is conjectured that higher values of the structure parameter may be easier to attack, since the lattice has more regularity. For example, in case of advancing research finding an incrementally better way to solve lattice problems, then a user may respond by increasing the difficulty parameter. On the other hand, if advancing research find a radically better way to solve a particular type of lattice problem, then the user may respond with decreasing the structure parameter.

For example, a cryptographic device as defined in the claims may even receive the difficulty parameter (d), and the structure parameter (n) which together suffice to specify the type of cryptography that is used. For example, in an embodiment a scheme is defined that can efficiently instantiate multiple underlying problems, namely RLWE, RLWR, module RLWE, module RLWR, and LWE and LWR. This is clearly not needed however, and an embodiment may select a fixed dimension of matrix, e.g., k×k, and if polynomials are used a reduction polynomial of degree n The cryptographic device is an electronic device. For example, the cryptographic device may be a mobile electronic device, e.g., a mobile phone. For example, the cryptographic device may be set-top box, smart-card, computer, etc. The method of performing a cryptographic operation described herein may be applied in a wide range of practical applications. Such practical applications include financial applications, confidential or authenticated communication, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a key agreement network, FIG. 2 schematically shows an example of an embodiment of an electronic key exchange method, FIG. 3a schematically shows a computer readable medium having a writable part comprising a computer program according to an embodiment, FIG. 3b schematically shows a representation of a processor system according to an embodiment, FIG. 4 schematically shows an example of an embodiment of a shared matrix.

LIST OF REFERENCE NUMERALS IN FIGS. 1-2

Figure 1:
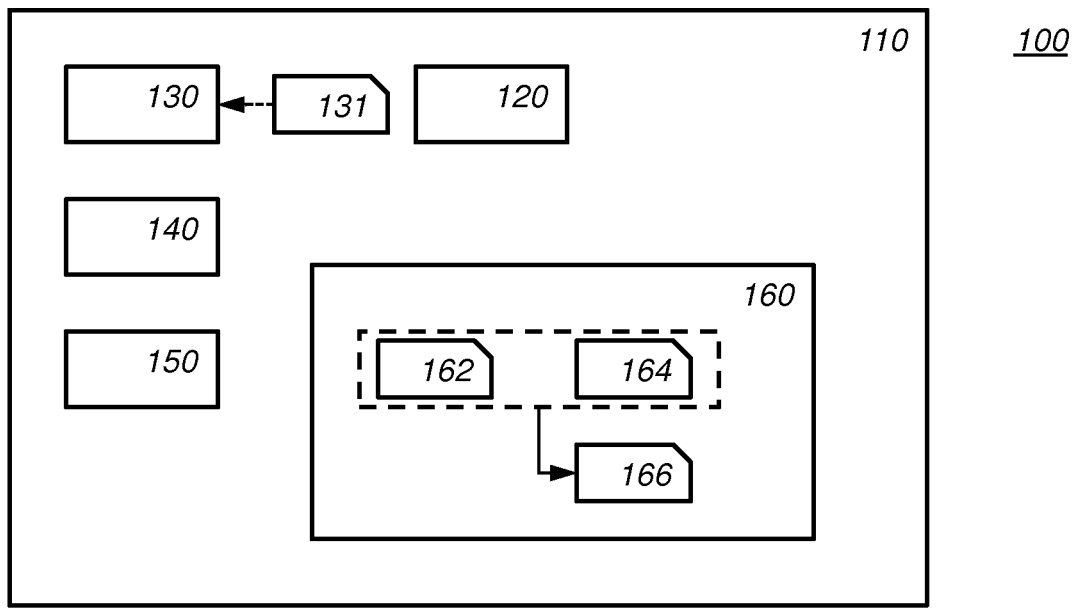
Figure 1:
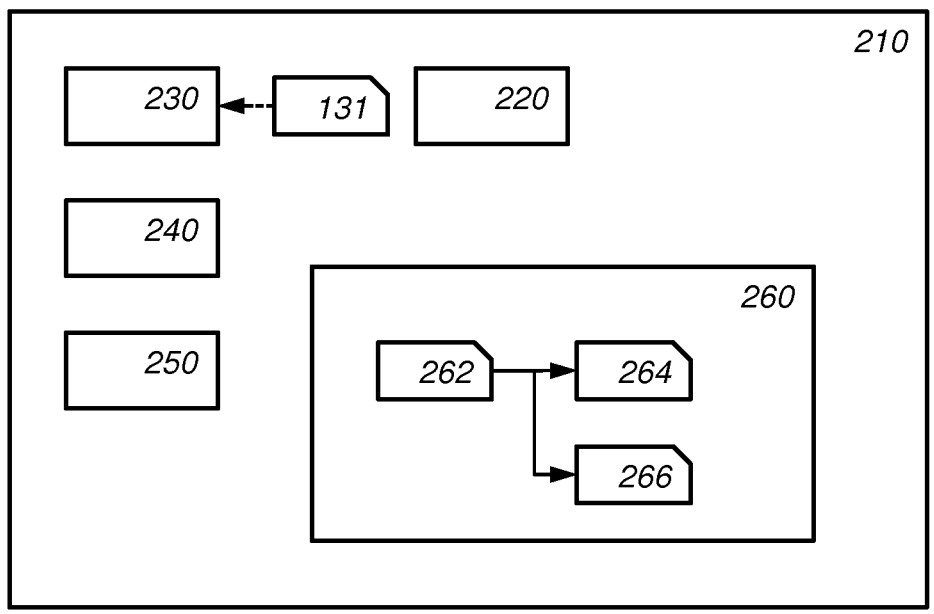

100 a key agreement network
110 a network node of initiator type
120 a communication interface
130 a shared matrix unit
131 a shared pool
140 a private key matrix unit
150 a public key matrix unit
160 a shared key unit
162 a raw key
164 reconciliation data (h)
166 a shared key
210 a network node of responder type
220 a communication interface
230 a shared matrix unit
240 a private key matrix unit
250 a public key matrix unit
260 a shared key unit
262 a raw key
264 reconciliation data (h)
266 a shared key
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described. In the following, for the sake of understanding, elements of embodiments are described in operation. However, it will be apparent that the respective elements are arranged to perform the functions being described as performed by them. Further, the invention is not limited to the embodiments, and the invention lies in each and every novel feature or combination of features described herein or recited in mutually different dependent claims.

Recall, that there are several schemes based on lattices for the design of a key exchange (KEX) protocol, a key encapsulation method (KEM), public-key encryption (PKE), digital signatures, etc. Examples of those schemes are:

Frodo that is a KEX based on the Learning with Errors (LWE) problem.

NewHope that is a KEX based on the Ring Learning with Errors (RLWE) problem.

NewHopeSimple that is a KEM designed for chosen plaintext attack (CPA) based on RLWE.

Kyber that is a CPA-KEM and CCA-KEM based on the module LWE problem.

spKEX that is a KEX based on the Learning with Rounding (LWR) problem.

Each of the above schemes implements a cryptographic protocol (e.g., a KEX, a KEM, PKE, digital signature) relying on a single underlying lattice problem: either LWE, or RLWE, or module-LWE for a fixed ring, or LWR.

NewHope and NewHopeSimple only rely on RLWE using ring $$\frac{z_q[x]}{x^{1024}+1}$$

Kyber only relies on combining k modules, each module being polynomials in $$\frac{z_q[x]}{x^{256}+1}$$

spKEX only relies on LWR

Frodo only relies on LWE

Although all the problems above are related, some of them are considered riskier in that they rely on special structures. On the other hand, the usage of a ring structure allows for smaller messages. Even though at present attacks employing such structures are unknown, such attacks might become known in future. All schemes based on those specific problems (e.g., RLWE or module LWE) would then be broken. There is thus a need for a fallback position. Thus, multiple schemes need to be implemented and tested, some based on more risky problems yet with better performance properties and some based on well-understood problems yet with a less good performance.

The inventors realized that the above lattice problems are related, and found a scheme that can instantiate all such problems, including: RLWE, RLWR, moduleLWE, moduleLWR, and LWE and LWR. Below several examples are described of a cryptographic in which different lattices are created based on a difficulty parameter d, and a structure parameter n.

By changing parameters in this scheme, we can, thus, instantiate protocols (KEX, KEM, PKE, etc.) based on different underlying problems and exhibiting different performance properties.

This scheme can be applied to multiple applications with different security/performance demands. For instance, top-secret documents can be encrypted by using the scheme settings for LWE while key agreement over a resource-constrained wireless communication can be based on Ring LWR parameters. The scheme has additional advantages: first, it reduces the of code size so that less memory is required. Second, effort for code review is minimized since a single algorithm needs to be reviewed and verified. Finally, such a scheme prepares for a potential transition scenario in which relying on a "weaker" problem (e.g. RLWE) is no longer secure and new algorithms relying on a "stronger" problem (e.g., based on LWE) are required. The scheme does not rely on two different specifications, one for Problem 1 and another for Problem 2, etc., but that the same algorithm is used to instantiate different problems, the only difference being the input parameters.

The core invention uses a lattice problem of dimension d—where d is an input parameter. The lattice dimension can be the one corresponding to RLWE, RLWR, Module-LWE, Module-LWR, LWE, LWR. The scheme relies on a matrix containing k×k entries, where each entry is an element in $Zq[x]/f[x]$ where $f[x]$ is a reduction polynomial of degree n and n is an input parameter. k is defined to be d/n and it is not an input parameter, in embodiments it is assumed that d is a multiple of n.

Thus, given a fixed lattice dimension d and the degree of the reduction polynomial n, we can obtain the number of entries ($k^2$) of the matrix. Note that this is a key difference with module lattices. For example, in such lattices some authors optimize the ring operations in a polynomial ring (namely, $f(x)=x^{256}+1$) and they use the number of modules to "increase" the lattice dimension as d=256*k. This scheme can only be instantiated as module RLWE or RLWE that is too small for security purposes.

If n=1, then this represents a matrix for LWE or LWR.

If n=d, then this represents a matrix for RLWE or RLWR.

If 1<n<d, then this represents a matrix for module-LWE or module-LWR.

Without loss of generality, we note that in the following sections we often focus on two cases only, namely n=1 and n=d.

KEX Based on LWR and NTRU-RING LWR

In the following, we will use the NTRU ring to illustrate our embodiments. In practice, other rings can be used as well such as (prime) cyclotomic polynomials taking q to be a prime ensuring that n=1 (mod p). Alternatively, we can also take (prime) cyclotomic polynomials with q being a power of two. An additional restriction is that the (prime) cyclotomic polynomial is irreducible module 2.

The NTRU ring is $f(x)=x^n-1$ where n is a prime number. Then for a given lattice dimension problem d, we can instantiate the system—for instance—with n=d or n=1. If n=d, then we have a NTRU-RING LWR and if n=1, then we have a LWR scheme. We can also take an input parameter d>n and d being a multiple of prime n such that we have a module-LWR using NTRU-Ring.

TABLE 1 high level KEX protocol description. Note that round(vector, p, q) indicates performing rounding using modules p and q. Note that we ignore details on how key reconciliation is done since they are not fundamental for this description. The further information below contains PKE, CPA-KEM and CCA-KEM protocols including all required details.

| Initiator | Responder |
|---|---|
| Input n and d where n is prime and n is a divisor of d | |
| Create matrix A with d/n x d/n entries in Z [x]/f[x] | |
| Create secret s containing d/n entries in Z[x]/f(x) | |
| Create public-key b = round (A s, p, q) with d/n elements in Zp[x]/f(x), where A s is the product of the matrix A and secret vector s, computed modulo f(x) and modulo q | |
| Send (b, A) | |
| | Create secret r containing d/n elements in Z[x]/f(x) |
| | Create public-key u = round (r^t A, p, q) with d/n entries in Zp[x]/f(x) where r^t A is the matrix product of the transposed secret vector r and matrix A, computed modulo f(x) and modulo q |
| | Compute raw key rkr=(rAt b) (mod p) containing d/n entries in Zp+x+/f(x), where rAt b is the matrix product of the transposed secret vector r and matrix b, computed modulo f(x) and modulo p |
| | Compute helper data (h) from rkr |
| | Send (u, h) |
| Compute raw key rki = u s (mod p) containing d/n elements in Zp[x]/f(x), where u s is the product of the public key u and secret vector s, computed modulo f(x) and modulo p | |
| Compute final key from h and rki. | |

From the above, we can see that depending on the choice of n, the underlying problem is RLWR (if n=d) or LWR (n=1). In both cases, the underlying lattice problem has dimension d. Note that the state of the art would have two different implementations of the above algorithm, namely:

TABLE 2

Note that we ignore rounding required in LWR when the public keys b and u are computed since it is not essential for the description. We also ignore details on how key reconciliation may be done, see the references.

| LWR-based KEX (note that some operations are missing to illustrate the protocol) | | RLWR-based KEX (note that some operations are missing to illustrate the protocol) | |
|---|---|---|---|
| Initiator | Responder | Initiator | Responder |
| Create A with d x d elements in Z Create secret s, an integer vector of length d (Z^d) Create public-key b = round (As, p, q) in Z_p^d where A s is the product of matrix A and vector s, computed modulo q Send (b, A) | | Create a in Zq[x]/f(x) Create secret s in Z[x]/f(x) Create public-key b = round (a * s, p, q) in Zp[x]/f(x) where * is polynomial multiplication, computed modulo f and modulo q Send (b, a) | |
| | Create secret r in Z^d Create public-key u = round (r^t A, p, q) in Z_p^d where r^t A is computed modulo q. Compute raw key rkr = (r^t b) (mod p) in Z_p), where r^t b is the matrix product of the transposed secret vector r and matrix b, computed modulo p, Compute helper data (h) from rkr Send (u, h) | | Create secret r in Z[x]/f(x) Create public-key u = round (a * r, p, q) in Zp[x]/f(x) where a * r is computed modulo f and modulo q. Compute raw key rkr = b * r in Zp[x]/f(x), where * is polynomial multiplication, computed modulo f and modulo p. Compute helper data (h) from rkr Send (u, h) |
| Compute raw key rki = (u s) (mod p) Compute final key from h and rki, where u s is the product of the public key u and secret vector s, computed modulo p. | | Compute raw key rki = u * s in Zp[x]/f(x), where * means polynomial multiplication, computed modulo f and modulo p Compute final key from h and rki. | |

Note that: rki, and rkr are the raw keys of the initiator and responder respectively.

As described in the background and problem statement, current schemes in Table 2 rely on a single problem and thus are optimized with slightly different parameters and algorithms. For instance, RLWE problems usually rely on ring $Zq[x]/x^n+1$ where n is a power of two and q is a prime number so that the Number Theoretic Transform (NTT) can be used. These choices are not optimal for combining with non-ring versions since it requires q to be a prime that makes modular operations more complex when performing matrix operations.

The scheme in Table 1 is defined to work with similar parameters and routines. This is a particular reason for using the NTRU ring in this description since it relies on a q that is a power of two that is also a good choice for LWE/LWR schemes. This also allows us to use the same routine for the key reconciliation step that relies on the fact that both q and i powers of two [2]. These details are explained in detail in the further information below explaining the embodiment for CPA-PKE, CPA-KEM and CCA-KEM.

Note also that in the protocol explained in Table 1 we have references to round ( ) that is a function that performs rounding as defined in the LWR problem.

Reference Implementation (Part 1)

A reference implementation of the scheme in Table 1 would have the following routines for obtaining the public-key elements (b and u) and raw keys (rki and rkr):

Computation of Public-Keys:

```
Result[ ] = Computation of public-key(A[,],s[ ])
    Result[ ] = 0
    For (i=0 to d/n)
        For (j=0 to d/n)
            Result[i] = Add_elements(Result[i],
Multiply_elements[A[i,j],s[j])
    C[ ]=Add_elements(A[ ],B[ ])
        For(i=0 to n)
            C[i]=(A[i]+B[i] (mod q))
    C[ ]=Multiply_elements(A[ ],B[ ])
        C[ ] =0
            For(i=0 to n)
```

-continued

```
        For (j=0 to n)
            C[i]=C[i]+ A((i-j)mod n)*B[j] mod q
```

Note that in the above routines we do not include the rounding step using moduli p and q as in Table 1. However, this is not essential to this invention. If we were doing a LWE version of this scheme, the rounding would be substituted by the addition of noise (e.g., Gaussian noise of mean 0 and small standard deviation) in $Z\_q[x]/f(x)$.

Computation of Raw-Keys:

```
Result[ ] = Computation of raw-key(b[ ],s[ ])
    Result[ ] = 0
For (i=0 to d/n)
    Result[i] = Add_elements(Result[i],
Multiply_elements[b[i],s[i])
    C[ ]=Add_elements(A[ ],B[ ])
        For(i=0 to n)
            C[i]=(A[i]+B[i] (mod p) (mod x^n-1)
    C[ ]=Multiply_elements(A[ ],B[ ])
        For(i=0 to n)
            C[i]=(A[(n-i)mod(n)]+B[i]) (mod p) (mod x^n-1)
```

Note that in the algorithms for raw-key computation we write mod p since we consider Learning with Rounding. Alternatively, we could first multiply each coefficient of A and B with q/p, round to the closest integer, perform addition or multiplication modulo q, and scale the final result by coefficient-wise multiplication with p/q, follow by rounding to the next integer. This may have security advantages. For a (ring) learning with errors version of this invention, we would add noise instead of performing rounding and computations would be modulo q Reference Implementation (Part 2)

We note that the secrets associated to initiator and responder in a protocol (KEX, KEM, PKE, etc.) can be more than a single vector containing d/n elements in $Zq[x]/f(x)$, but can contain n_bar and m_bar of those vectors. Having n_bar and m_bar greater than one is preferred in order to generate enough key bits. Thus, all operations in the scheme in a reference implementation can be represented as the multiplication of two matrices whose elements are in $Zq[x]/f(x)$.

For this, the following generic function is required:

$$C=\text{Multiply}(A,B,A\_c,A\_r,B\_c,B\_r,n)$$

where A and B are the input matrices of dimensions (A_c×A_r) and (B_c×B_r) respectively. Each entry in the matrix contains an element in $Zq[x]/f(x)$, which can be represented as n elements in Zq. The output matrix C has dimension (C_c×C_r)=(A_r×B_c).

Furthermore, in some cases, it is required a function to transpose the matrices. For this, we require a function:

$$B=\text{Transpose}(A,A\_c,A\_r,n)$$

where A is the input matrix of dimensions (A_c×A_r). Each element in the matrix contains an element in $Zq[x]/f(x)$, which can be represented as elements in Zq. The output matrix B has dimension (B_c×B_r)=(A_r×A_c).

A particular way of encoding the information in a matrix is by using a vector that stores at the lowest level elements in Zq. For instance, if $q=2^{14}$, then two bytes can be used to store each element. A matrix A of dimension (A_r×A_c) with elements in $Zq[x]/f(x)$ can be stored in a vector of length $A\_r*A\_c*n*2$ bytes (where we assume that $q<=2^{16}$). This vector would encode A: (i) row by row, (ii) in each row column by column, and (iii) then the n elements in Zq.

The above two functions (Multiply( ) and Transpose( )) would access the vector used to store the matrices in the suitable way. This is also the reason why n is passed as input parameter to those two functions.

Optimized Implementation of the Public-Key Computation (Part 1):

For a fixed security parameter d, the above reference implementation is fast for the case n=d since the A matrix contains a single entry that is a polynomial in $Zq[x]/x^n-1$, assuming that n_bar=m_bar=1 For n=1, a reference implementation will be slow since A contains $d^2$ entries, each entry being an element in Zq and scalar multiplication is realized as a generic polynomial multiplication.

For an optimized implementation, we can exploit the fact that in the case n=d, polynomial multiplications operations can be expressed as the multiplication of a d×d=n×n matrix over Zq and a vector of length d with entries from Zq:

$$a*s = \begin{pmatrix} a_0 & a_{n-1} & \ldots & a_1 \\ a_1 & a_0 & \ldots & a_2 \\ \ldots & \ldots & \ldots & \ldots \\ a_{n-1} & a_{n-2} & \ldots & a_0 \end{pmatrix} \begin{pmatrix} s_0 \\ s_1 \\ \ldots \\ s_{n-1} \end{pmatrix}$$

Using this fact, when implementing the public-key computation, we can always assume an input matrix A that will contain $d^2$ different elements for n=1 (LWR) and d different elements for n=d (RLWR). The only difference between the algorithms when performing the matrix multiplications is that the matrix multiplication for the responder is from the left for n=1 and from the right for n=d.

Alternatively, the coefficients of polynomials can be organized as row vectors, and we use that $$a*s = (s_0, s_1, \ldots, s_{n-1}) \begin{pmatrix} a_0 & a_1 & \ldots & a_{n-1} \\ a_{n-1} & a_0 & \ldots & a_{n-2} \\ \ldots & \ldots & \ldots & \ldots \\ a_1 & a_2 & \ldots & a_0 \end{pmatrix}$$

Optimized Implementation of the Public-Key Computation (Part 2)

As disclosed in a related Philips filing [1], A can be efficiently refreshed given a master matrix A_master by applying a permutation. The permutation can, e.g., be a cyclic shift (by a random offset (between 0 and n−1) of a number n' (0<=n'<n) of the rows in A_master.

A natural extension of this is to consider A_master as a vector a_master of length L and apply a permutation on it to obtain the rows of A. We differentiate three cases with very specific permutations:

Case 1: $L=d^2$ and the permutation to obtain row i of A comprises taking the d consecutive elements starting in position i*d of $a_{master}$ and cyclically rotating them a random offset between 0 and d−1.

Case 2: L≈q and the permutation to obtain row i of A comprises taking the d consecutive elements, starting in element $e_i$ of $a_{master}$ where $e_i$ is a randomly chosen value in [0, L−1] and ending in element $e_i$+d (mod L) (thus, considering also a cyclic structure).

Case 3: L=d and the permutation to obtain row i of A comprises taking the d consecutive elements (considering also a cyclic structure) starting in element i of $a_{master}$.

Obviously, the above three cases can be further generalized by using other types of permutations or making $L>d^2$. For the three cases in this approach:

Case 1 implements the scheme described in this document for n=1. If $a_{master}$ is computed randomly, then the resulting A cannot be differentiated from a random matrix. Since elements are rotated by a random offset, then given fixed a_master, this approach can efficiently obtain a fresh A.

Case 3 implements the scheme for n=d and provides an efficient way for obtaining the matrix representation of a in the polynomial convolution a*s.

Case 2 is a case between a ring structure and a non-ring structure. For this case, it is not possible to have a reduction to (LWR) since there will be some overlap between the rows in A since $L<d^2$. Thus, it is possible to distinguish the resulting matrix A from a random one. However, from a practical point of view, this approach destroys the single ring structure in the resulting A since it contains many more elements. Effectively, each row is using a different ring.

If we incorporate the above approach to the optimized implementation (Part 1), we can implement the matrix multiplication in terms of $a_{master}$ of a given length L, a permutation of some specific features and the secret s. Depending on the choice of the length L and the permutation, the same algorithm implements efficiently the matrix multiplication for both n=1 and n=d.

We note that in case 1, a_master can be re-used, it and fresh matrices A are obtained by varying the row permutations. In case 3, it is advisable to regularly update a_master.

This is summarized in the following table in which we observe that depending on the choice of L, we can obtain different performances and security assurances. We observe that taking L=q does not have benefits from bandwidth point of view, since structure is destroyed and more information needs to be transmitted to convey A; however, CPU-wise, the approach is more efficient since fewer random numbers need to be computed.

| Value of L | Corresponds to | Problem reduces to | Performance (bandwidth) | Performance (CPU) |
|---|---|---|---|---|
| d | n = d | RLWR | As of RLWR | As of RLWR |
| q | n = 1 | RLWR | As of LWR | Close to RLWR |
| d^2 | n = 1 | LWR | As of LWR | As of LWR |

Optimized Implementation (Part 3)

The same permutation idea can be applied to the computation of the raw key knowing that in both cases the public-key contains d elements in Zp. For n=1, those are in fact d elements in $Zp=Zp[x]/x-1$. For n=d, those d elements are the coefficients of a polynomial in $Zp[x]/x^d-1$.

For n=1, the d elements of the received public key are processed in the received order, but for the case n=d, the d elements first need to be rearranged to resemble the order of the first row of the matrix that would implement the polynomial evaluation. Then we can define two transformations:

$$T_{n=1} = \begin{pmatrix} 1 & \dots & 0 \\ \dots & \dots & \dots \\ 0 & \dots & 1 \end{pmatrix} \quad T_{n=d} = \begin{pmatrix} 1 & 0 & \dots & 0 \\ 0 & 0 & \dots & 1 \\ \dots & \dots & \dots & \dots \\ 0 & 1 & \dots & 0 \end{pmatrix}$$

Furthermore, we consider that two permutations are applied to obtain a matrix resembling the polynomial multiplication $$P_{n=1} = \begin{pmatrix} 1 & \dots & 0 \\ \dots & \dots & \dots \\ 0 & \dots & 1 \end{pmatrix} \quad P_{n=d} = \begin{pmatrix} 0 & 0 & \dots & 1 \\ \dots & \dots & \dots & \dots \\ 0 & 1 & \dots & 0 \\ 1 & 0 & \dots & 0 \end{pmatrix}$$

Given this, an optimized algorithm to obtain the raw key works as follows:

```
Result[ ] = Computation of raw-key(b[ ],s[ ])
    Result[ ] = 0
    For (i=0 to n)
        For j=0 to d
            Result[i] = Result[i] + T_n(b)[(P_n(j)+i)mod(d)] * s(j)
```

Note that $T_d$ is required as we receive the coefficient vector $b=(b_0, b_1, \dots, b_{n-1})^T$ and need to obtain the top row of the circulant matrix with b as leftmost column.

In the above algorithm, $T_n$ acts on b to rearrange the elements properly and $P_n$ performs a shift on $T_n(b)$ to perform the module reduction operations.

Optimized Implementation (Part 4)

A key aspect for the optimized implementation is the realization of the permutation on a_master. This requires realizing reductions modulo L and modulo d. This has drawbacks regarding performance and side-channel attacks. To avoid these modular reductions, e.g., on a vector v:

$$v[(i+P[j])(\text{mod } d)]$$

the optimized implementation can work with a vector v_star that just contains a copy of vector.

$$v\_star = v|v$$

Where | represents concatenation. This increases the memory requirements but avoids the modular reduction.

We also note that this approach can allow implementing other rings in an efficient way. For instance, if we used ring $Zq[x]/x^n+1$ then v_star would be obtained as:

$$v\_star = v|-v$$

Indeed, then we would have that $$a*s = \begin{pmatrix} a_0 & -a_{n-1} & \dots & -a_1 \\ a_1 & a_0 & \dots & -a_2 \\ \dots & \dots & \dots & \dots \\ a_{n-1} & a_{n-2} & \dots & a_0 \end{pmatrix} \begin{pmatrix} s_0 \\ s_1 \\ \dots \\ s_{n-1} \end{pmatrix}$$

So A has minus signs above the diagonal; in fact $A(i,j) = a_{i-j}$ if $i \geq j$ and $A(i,j) = -a_{n+i-j}$ if $i<j$. As $a_0 = A(0,0)$ and $a_k = -A(0,n-k)$ for $1 \leq k \leq n-1$, it follows that $A(i,j) = -A(0,n-i+j)$ if $i>j$ and $A(i,j) = A(0,j-i)$ if $j \geq i$. So $A(i,j) = v(n-i+j)$ where $v(k) = -A(0,k-n)$ if $k<n$ and $v(k) = A(0,k-n)$ for $k \geq n$.

CPA-PKE, CPA-KEM and CCA-KEM Based on LWR and NTRU-RING LWR

The further information below describes how to construct CPA-PKE, CPA-KEM and CCA-KEM protocols based on the ideas described so far. These protocols can thus be instantiated to rely on LWR and NTRU-RING LWR just by using different configuration parameters.

The NTRU ring has reduction polynomial $f(x) = x^n - 1$ where n is a prime number. Then for a given lattice dimension problem d, we can instantiate the system with n=d or n=1. If n=d, then we have a NTRU-RING LWR and if n=1, then we have a LWR scheme.

We note that even if the description uses as input parameters (d,n) either (d,d) or (d,1), we can also have an even more general configuration in which the input parameters are (k*n,n) where n can be either 1 or a prime number (in the case of the NTRU Ring).

OTHER EMBODIMENTS

We note that the description does not rely on the type of secret or on the fact of using rounding or standard addition of noise (either Gaussian, uniform, or of any other distribution). Thus, this invention can be implemented for any type of secret distribution.

Applicability to RLWE: The further information below contains specific choices for the NTRU ring and takes p and q to be power of two. These choices are motivated by the specific type of key reconciliation method and the fact that having p and q as power of two leads to a more efficient implementation. Alternative embodiments apply the ideas in this document to R/LWE. In this case, noise needs to be added instead of applying rounding.

Applicability to other protocols: we have shown in this document how to apply our design in the construction of KEX, KEM, or PKE. The same methodology also works for El-Gamal like type of schemes. The scheme can also be applicable to other schemes such as signatures.

Usage of Other Rings

Most of the embodiments in this document are based on the NTRU ring $f(x)=x^n-1$. However, this polynomial is not irreducible and equals $(x-1)(x^{(n-1)}+x^{(n-2)}+ \ldots +x+1)$. This makes the RLWE decision problem (b=as+e) easy to solve. Still, finding s remains hard.

Literature uses other rings that can be used in the above embodiments. For instance, it is possible to use cyclotomic rings of the form $x^n+1$ where n is a power of two and q is a prime number and $q\equiv1(\bmod n)$. It is also possible to use prime cyclotomic rings of the form $f(x)=x^{n-1}+n^{n-2}+ \ldots +x+1$ and q a prime number and $q\equiv1(\bmod n)$.

We can use these rings in a similar way as we have shown above for the NTRU ring. For instance, the non-ring case (LWE) is then implemented with ring $(x^{n=1}+1)$ or (1) when n=1 for above cyclotomic rings. Note that in both cases q is a prime number. We note that the key reconciliation method is different to the one used in the embodiment detailed above since it requires q to be a power of two. A suitable choice would be a key reconciliation as the one in Frodo.

Another good option is to use cyclotomic polynomials as the above, namely $x^n+1$ and $x^{n-1}+x^{n-2}+ \ldots +x+1$ and use a q that is a power of two instead of being a prime number. The requirement on q being a prime is mainly to use the NTT, however, for an implementation of our scheme, choosing q to be a power of two is better since a good option is to implement the scheme by means of matrix multiplications.

Another good option is to use cyclotomic polynomials as the above, namely $x^n+1$ and $x^{n-1}+x^{n-2}+ \ldots +x+1$ and use a q that is a power of two with the additional requirement that the polynomial is irreducible module 2.

We also note that if the prime cyclotomic polynomial is used, $x^{n-1}+x^{n-2}+ \ldots +x+1$, then operations can still be carried out in the ring $x^n-1$ since both rings only differ a term x-1. To this end, it is only required to lift the values from one ring to the other one by multiplying by x-1. Once operations are realized, we can go back to the previous ring by dividing by the same amount.

Rationale of Parameter Choices from a Performance Viewpoint

Some computational optimizations known for RLWE cannot be applied to some embodiments presented in this document. In particular, it is not possible to apply the NTT to the NTRU ring. An alternative would be to use NTT friendly parameters such as n a power of 2 and q prime numbers so that operations in $Zq[x]/f(x)$ where $f(x)=x^n+1$ can be performed by means of the NTT. This optimization would speed up CPU performance for the ring case (n>1) due to the usage of NTT, however, we expect a worse performance for the non-ring case (n=1) since operations would be modulo q (q being a prime number).

The parameter choices presented in this document seem to be the best ones for a combined scheme since it allows for a fast implementation of operations when performed by means of matrix/vector operations applicable to any choice of n. In other words, even if scheme for n>1 might not be as efficient as it could be another ring scheme using NTT, the choice in this document allows for a very fast implementation of the scheme when n>1 but also when n=1. Furthermore, the usage of NTRU rings allows for a fine-tuning of security and bandwidth requirements since there are many suitable rings.

Parameters

The scheme can be configured with different parameters. The values of d and q and p define the difficulty of the underlying lattice problem. Exemplary values are for instance a d of around 700 and q and p equal to $2^{14}$ and $2^{11}$. In this case, n_bar and m_bar can be equal to 8 so that 4 bits can be obtained from each coefficient for the resulting key matrix in a KEX when n=1. When n=d, then a single bit is required per polynomial coefficient so that the q can be made smaller, and therefore also the p, and therefore also the n. Since a polynomial has n coefficients, then a key of n bits is obtained and n_bar and m_bar only need to be equal to one.

We note that for some choices of rings, we can have multiple sets of parameters. For instance, if we take the prime cyclotomic polynomials, we can have the following classes of parameters:

Parameters for n=1 and n=d determining whether the underlying problem is based on a ring structure or not.

q being a prime number or a power of two determining the type of optimizations that are feasible from a CPU point of view.

Configurability of the Scheme

The scheme can be configured for different security levels and underlying hard-problem as follows:

First, for each of the underlying problems (e.g., LWR or RLWR), a computer program computes the target parameters (mainly, d, n, q and p) to achieve a given security level and performance in terms of failure probability, bandwidth and CPU. This task can be executed a single time and then parameters can be published.

Second, the sets of published parameters are stored in a table together with the program implementing the scheme proposed in this document, each set of parameters corresponding to a given underlying problem, security level, and performance parameters.

Third, when two parties (e.g., Alice and Bob) wish to communicate with each other, Alice informs Bob about the set of parameters that she is willing to use. This means that Alice can determine whether she wants to use the scheme, e.g., in ring or non-ring mode (d and n choices) and at which security level (dependent on d, q, and p). Alice can inform Bob about her choice by explicitly specifying the set parameters (d, n, q, p, . . . ), by sending an identifier of the set of parameters, or by specifying performance values (e.g., size of public-key, size of private-key . . . ) that depend on the chosen parameters. We note that Bob can then also have a policy that requires not only a minimum-security level, but also a certain hard problem. Thus, if the proposal from Alice is not satisfactory, then Bob can request a different set of parameters.

Below is further information regarding the above, and further embodiments, from a more mathematical point of view.

1 Algorithm Specifications and Supporting Documentation
  1.1 Design Rationale
  1.2 Underlying Problems
  1.3 Preliminaries
  1.4 CPA Public-Key Encryption
  1.5 CPA Key Encapsulation Method for the Non-Ring case
  1.6 CCA Key Encapsulation Method Framework for the Non-Ring case
  1.7 Non-ring and ring case combined
  1.7.1 Framework Configurations
  1.7.2 Parameter sets
  1.7.3 NIST Levels
1 Algorithm Specifications and Supporting Documentation
1.1 Design Rationale Some embodiments relate to a framework of algorithms to enable Key Encapsulation. The proposed algorithms fall under the category of lattice-based cryptography, in particular, they may rely on the Learning with Rounding (LWR) problem. This problem has been chosen for the design of the algorithms due to its extensive study and its advantageous performance properties, e.g., reduced bandwidth requirements.

An interesting feature of some embodiments is that the framework has been designed to instantiate the LWR problem and the Ring LWR (RLWR) in a seamless way. This means that the same algorithms (and code) can be used to efficiently instantiate LWR- or RLWR-based algorithms. The rationale of this choice is manifold.

First, this allows adapting to multiple environments in a simple way: on the one hand, LWR-based algorithms can be applied to environments in which performance is less of an issue, but security is the priority so that it is preferred to not have the additional ring structure. On the other hand, RLWR-based algorithms achieve the best performance in terms of bandwidth and computation so that they better fit in more constrained environments.
  Second, this approach enables a migration strategy from ring-based schemes to non-ring schemes from day one. This makes sure that if attacks on ring-based schemes are found in the future, due to the underlying ring structure, then an alternative secure solution is already available and deployed.
  Third, the proposed framework reduces maintenance and code analysis since the same implementation instantiates the RLWR and LWR cases for all algorithms CPA-KEM, CCA-KEM and CCA-PKE.

Embodiment further optimize performance by means of several differentiating features. First of all, the usage of LWR and RLWR optimizes bandwidth performance and avoids sampling routines. Second, sparse ternary secrets are chosen since they ease implementation, allow for improved performance, and reduce failure probabilities. Third, in order to prevent pre-computation attacks, the public matrix A is not kept constant, but is renewed in a very efficient way to minimize performance degradation due to its re-computation during a handshake. Fourth, functionality for performing rounding, message compression, and decryption is instantiated by means of the same function. This simplifies and optimizes the design. Fifth, the ring version of this proposal relies on the NTRU Ring due to its good performance features.

1.3 Preliminaries

We denote the polynomial ring $Z[x]/(x^n-1)$ by $R_n$. We will allow that $n=1$; then $R_n=Z$. By abuse of notation, for each positive integer a, we write $Z_a$ for the set $\{0, 1, \ldots, a-1\}$, and $R_{n,a}$ for the set of polynomials of degree less than n with all coefficients in $Z_a$. We call a polynomial in $R_n$ trinary if all its coefficients are 0, 1 or −1.

Throughout this document, regular font letters denote elements from $R_n$, and bold lower-case letters represent vectors with coefficients in $R_n$. All vectors are column vectors. Bold upper-case letters are matrices. The transpose of a vector v or a matrix A is denoted by $v^T$ or $A^T$.

Modular Reductions For a positive integer $\alpha$ and $x \in Q$, we define $\{x\}_\alpha$ as the unique element x' in the interval $(-\alpha/2, \alpha/2]$ satisfying $x' \equiv x \pmod{\alpha}$. Moreover, we define $\langle x \rangle_\alpha$ as the unique element x' in the interval $[0,\alpha-1]$ such that $x \equiv x' \pmod{\alpha}$.

Rounding For $x \in Q$, we denote by $\lfloor x \rceil$ rounding of x to the closest integer, with rounding up in case of a tie.

Compression and decompression Let a, b be integers such that $a > b$. We define functions $\text{Compress}_{a,b}: Z_a \to Z_b$ and $\text{Decompress}_{a,b}: Z_b \to Z_a$ as $$\text{Compress}_{a,b}(x) = \left\langle \left\lfloor \frac{b}{a} \cdot x \right\rceil \right\rangle_b, \text{ and } \text{Decompress}_{a,b}(x) = \left\langle \left\lceil \frac{a}{b} \cdot x \right\rfloor \right\rangle_a$$

It can be shown $\text{Decompress}_{a,b}$ is "nearly" the inverse of $\text{Compress}_{a,b}$. To be more precise, for each $x \in Z_a$, $$\left| \{\text{Decompress}_{a,b}(\text{Compress}_{a,b}(x)) - x\}_a \right| \le \frac{a+1}{2b}.$$

By direct computation it can be seen that if a is a multiple of b, then $$\text{Decompress}_{a,b}(\text{Compress}_{a,b}(x)) \equiv x + \{x\}_{b/a} \pmod{a}$$

for each $x \in Z_a$.

The compress function serves three purposes.
  First, it improves security since it leads to the Learning with Rounding problem.
  Second, it is used to decrypt a message.
  Third, it reduces the sizes of public keys and ciphertexts, thus reducing on bandwidth requirements.

For each $v \in R_n$, the Hamming weight of v is defined as its number of non-zero coefficients. The Hamming weight of a vector in $R_n^k$ equals the sum of the Hamming weight of its components. We denote with $H_{n,k}(h)$ the set of all vectors $v \in R_n^k$ of trinary polynomials of Hamming weight h. By considering the coefficients of a polynomial in $R_n$ as a vector of length n, a polynomial in $H_{n,k}(h)$ corresponds to a trinary vector of length nk with non-zeros in h positions, so that $H_{n,k}(h)$ has $nk_h 2^h$ elements.

For $v\Sigma_{i=0}^{n-1} v_i x^i \in R_n$, we define $\|v\|_\infty$ as the largest absolute value of its coefficients, that is, $$\|v\|_\infty = \max\{|v_i| \mid 0 \le i \le n-1\}.$$

It is easy to see that for all a, b∈$R_n$, we have that $$\|ab\|_\infty \le n \cdot \|a\|_\infty \|b\|_\infty.$$

Similarly, if V is a matrix of polynomials in $R_n$ then $\|V\|_\infty$ is the largest of all coefficients of the polynomials in V. Finally, for $\mu \le ab$ and $C \in Z^{a \times b}$, the vector $\text{Sample}_{\mu,a,b}(C) \in Z_p^\mu$ comprises the values in p pre-specified positions of C.

1.4 CPA Public-Key Encryption

In this section, we describe Public-Key Encryption for the non-ring case. Our CPA-secure public-key encryption scheme is described with the algorithms below. These algorithms assume knowledge of various system parameters, viz positive integers n, h, p, q, t, B, $\bar{n}$, $\bar{m}$, $\mu$. The algorithms include random choices, for a matrix $A \in Z_q^{n \times n}$, as well as for an $n \times \bar{n}$ matrix S and for a $n \times \bar{m}$ matrix R, both having all columns in $T_n(h)$. That is, both S and R are trinary matrices for which each column has Hamming weight h. To make the choice for A explicit, the system parameters include a randomness space $\Sigma$ and a mapping $f: \Sigma \to Z_q^{n \times n}$. Similarly, to make the choices for S and R explicit, we define functions $f_s$ and $f_R$ that assign, on an input from $\{0,1\}^{r_S}$ and $\{0,1\}^{r_R}$, respectively, generate trinary $n \times \bar{n}$ and $n \times \bar{m}$, respectively, with each column having Hamming weight h. For a set A, we denote by $$a \xleftarrow{\$} A$$

that a is drawn uniformly from A.

The first algorithm generates a public key pk in $\Sigma \times Z_p^{\bar{n}}$, and a secret key $sk \in T_n(h)^{\bar{n}}$, i.e., a trinary $n \times \bar{n}$ matrix of which each column has Hamming weight h.

---
Algorithm 1: PST.NR.CPA-PKE.Keygeneration()
---

Parameters Integers p, q, n, h, $\bar{n}$
Input -
Output $pk \in \sum \times Z_p^{n \times \bar{n}}$, $sk \in (T_n(h))^{\bar{n}}$ $\sigma \xleftarrow{\$} \sum$
A = f ($\sigma$)
$s \xleftarrow{\$} \{0, 1\}^{r_S}$
S = $f_S$ (s)
B = Compress$_{q, p}$ ($\langle AS \rangle_q$)
pk = ($\sigma$, B)
sk = S
return (pk, sk)

---

The next algorithm generates from a public key pk, a message m and a randomness variable $\rho$ a cipher text c.

---
Algorithm 2: PST.NR.CPA-PKE.Encryptwithrho(pk, m, $\rho$)
---

Parameters Integers p, t, q, n, $\bar{m}$, $\bar{n}$, $\mu$
Input $pk = (\sigma, B) \in \sum \times Z_p^{n \times \bar{n}}, m \in Z_{2B}^\mu, \rho \in \{0, 1\}^{r_R}$
Output $c = (U, v) \in Z_p^{n \times \bar{m}} \times Z_t^\mu$ A = f ($\sigma$)
R = $f_R$ ($\rho$)
U = Compress$_{q,p}$ ($\langle A^T R \rangle_q$)
$v = \text{Compress}_{p,t}\left(\left(\text{Sample}_\mu(B^T R) + \left\lceil \frac{p}{2^B} \right\rceil \cdot m\right)_p\right)$
c = (U, v)
return c

---

The encryption algorithm generates from a public key pk and a message m a ciphertext c.

---
Algorithm 3: PST.NR.CPA-PKE.Encrypt(pk, m)
---

Parameters Integers p, t, q, n, $\bar{m}$, $\bar{n}$, $\mu$
Input $pk = (\sigma, B) \in \sum \times Z_p^{n \times \bar{n}}, m \in Z_{2B}^\mu$
Output $c = (U, v) \in Z_p^{n \times \bar{m}} \times Z_t^\mu$ $\rho \xleftarrow{\$} \{0, 1\}^{r_R}$
c = PST.NR.CPA-PKE.Encryptwithro(pk, m, $\rho$)
return c

---

The decryption algorithm retrieves, from a secret key sk and a ciphertext c, an (estimate for) the plaintext message m.

---
Algorithm 4: PST.NR.CPA-PKE.Decrypt(sk, c)
---

Parameters Integers p, t, q, n, $\bar{m}$, $\bar{n}$, $\mu$
Input sk = S $\in (T_n(h))^{\bar{n}}$, c = (U, v) $\in Z_p^{n \times \bar{m}} \times Z_t^\mu$
Output $\hat{m} \in Z_{2B}^\mu$ v = Decompress$_{p,t}$ (v)
$\hat{m}$ = Compress$_{p,2^B}$ (v $-$Sample$_\mu(S^T U)$)
return $\hat{m}$

---

Note We could explain the operation of the scheme here.

1.5 CPA Key Encapsulation Method for the Non-Ring Case

The following three algorithms build on the public-key encryption scheme defined in a previous section to define a CPA-secure key encapsulation method. It employs a hash function H: $\{0,1\}^* \to \{0,1\}^{\mu B}$.

Note We could also have an additional hash function G: $\{0,1\}^* \to \{0,1\}^\kappa$, and apply G instead of H in steps 4 of the encapsulation algorithm and step 2 of the decapsulation algorithm.

---
Algorithm 5: PST.CPA-KEM.Keygeneration( )
---

Parameters Integers p, q, n, h, $\bar{n}$
Input
Output pk $\in \Sigma \times Z_p^{n \times \bar{n}}$, sk $\in (T_n(h))^{\bar{n}}$
(pk,sk) = PST.NR.CPA-PKE.Keygeneration( )
return (pk, sk)

---

---
Algorithm 6: PST.CPA-KEM.Encapsulate(pk)
---

Parameters Integers p, t, q, n, $\bar{m}$, $\bar{n}$, $\mu$, $\alpha$
Input $pk = (\sigma, B) \in \sum \times Z_p^{n \times \bar{n}}$
Output $c = (U, v) \in Z_p^{n \times \bar{m}} \times Z_t^\mu$, $K \in Z_{2B}^\mu$ $a \xleftarrow{\$} \{0, 1\}^\alpha$
m = H (a, pk)
c = PST.NR.CPA-PKE.Encrypt(pk, m)
K = H (m, c)
return (c, K)

---

---
Algorithm 7: PST.NR.CPA-KEM.Decapsulate(sk, c)
---

Parameters Integers p, t, q, n, $\bar{m}$, $\bar{n}$, $\mu$
Input sk = S $\in (T_n (h))^{\bar{n}}$, c = (U, v) $\in Z_p^{n \times \bar{m}} \times Z_t^\mu$
Output K $\in Z_{2B}^\mu$
m = PST.NR.CPA-PKE.Decrypt( sk, c )

| Algorithm 7: PST.NR.CPA-KEM.Decapsulate(sk, c) |
| --- |
| K = H(m,c) <br> return K |

Remark Note that in Algorithms 1.5 and 1.5, we implicitly map pk and c to a bitstring before feeding them to H.

1.6 CCA Key Encapsulation Method Framework for the Non-Ring Case

The Key Encapsulation framework is obtained by applying a KEM variant of the Fujisaki-Okamoto transform to our encryption scheme to make it CCA-secure.

We use the notation from the CPA-PKE scheme. We also need two hash functions, G: $\{0,1\}^* \rightarrow \{0,1\}^\beta \times R_R \times \{0,1\}^\gamma$, and H: $\{0,1\}^* \rightarrow K=\{0,1\}^\kappa$.

We first describe the key generation algorithm. Note that in case of equal randomization choices, the public keys pk are equal; the secret key with Algorithm 1.7 comprises the secret key, as well as the public key and a random string (z).

| Algorithm 8: PST.NR.CCA-KEM.Keygen() |
| --- |
| Parameters Integers p, q, n, h, $\bar{n}$, $\zeta$ <br> Input <br> Output - $pk \in \sum \times Z_p^{n \times \bar{n}}$, $sk \in (T_n(h))^{\bar{n}} \times \{0, 1\}^\zeta$ <br> ($pk_{CPA\text{-}PKE}$, $sk_{CPA\text{-}PKE}$) = PST.NR.CPA-PKE.Keygen() <br> $z \xleftarrow{\$} \{0, 1\}^\zeta$ <br> $pk = pk_{CPA\text{-}PKE}$ |

| Algorithm 8: PST.NR.CCA-KEM.Keygen() |
| --- |
| sk = ($sk_{CPA\text{-}PKE}$, z) <br> return (pk, sk) |

The output c of Algorithm 1.6 comprises, with equal input as Algorithm 1.4 and the same choice for R, the ciphertext (U, v) from Algorithm 1.4. It also comprises a key K.

| Algorithm 9: PST.NR.CCA-KEM.Encapsulate(pk) |
| --- |
| Parameters Integers p, t, q, n, $\bar{m}$, $\bar{n}$, $\mu$ <br> Input $pk = (\sigma, B) \in \sum \times Z_p^{n \times \bar{n}}$ <br> Output $c = (U, v, d) \in Z_p^{n \times \bar{m}} \times Z_t^\mu \times \{0, 1\}^\gamma$ <br> $m \xleftarrow{\$} Z_{2B}^\mu$ <br> $(\hat{K}, \rho, d) = G(\sigma, B, m)$ <br> $(U, v) = $ PST.CPA.PKE.Encryptwithro(pk, m, $\rho$) <br> c = (U, v, d) <br> K = H ($\hat{K}$, c) <br> return (c, K) |

With equal secret key S and equal input (U, v), the value of m' equals that as when given to Algorithm 1.4. We conclude that if the random choices in the NR CCA algorithms equal those of the NRCPA-PKE algorithms, and the NRCPA-PKE algorithms correctly retrieve the message m chosen in Line 1 of Algorithm 1.6, then m=m'. In that case, ($\hat{K}'$, $\rho'$,d') as computed in line 2 of Algorithm 1.6 equals ($\hat{K}$, $\rho$, d) in line 2 of Algorithm 1.6, and so the values of K as computed in line 8 of Algorithm 1.6 and Algorithm 1.6 are equal. If the condition in line 7 of Algorithm 1.6 is not satisfied, then the output is a random key.

| Algorithm 10: PST.NR.CCA-KEM.Decapsulate(pk, sk, c) |
| --- |
| Parameters Integers p, t, q, n, $\bar{m}$, $\bar{n}$, $\mu$, $\zeta$ <br> Input pk = ($\sigma$,B) $\in \Sigma \times Z_p^{n \times \bar{n}}$, sk = (S, z) $\in (T_n(h))^{\bar{n}} \times \{0,1\}^\zeta$, c = (U, v, d) $\in Z_p^{n \times \bar{m}} \times Z_t^\mu \times \{0,1\}^\gamma$ <br> Output K $\in$ K <br> m' = PST.NR.CPA - PKE.Decrypt(S(U, v)) <br> ($\hat{K}'$, $\rho'$, d') = G($\sigma$, B, m') <br> (U', v') = PST.CPA-PKE.Encryptwithrho (pk, m', $\rho'$) <br> if (U', v', d') = (U, v, d) then <br> return K = H($\hat{K}'$, c) <br> else <br> return K = H(z, c) <br> end if |

Remark In Algorithms 1.6 and 1.6, we implicitly map (σ, B) m' and c to binary strings before feeding then to G and H, respectively.

1.7 Non-Ring and Ring Case Combined

In this section, we describe a combined non-ring and ring version of the previous algorithm, with the polynomial ring $R_n=Z[x]/(x^n-1)$. We use * to denote multiplication in $R_n$. To stress the similarity with the non-ring case, we identify the polynomial $\Sigma_{i=0}^{n-1} f_i x^i$ and the (column) vector $(f_0, f_1, \ldots f_{n-1})^T$. For $f, g \in Z^n$, we define f*g as the coefficient vector of the polynomial $f(x)g(x)(\mod(x^n-1))$. That is, for $0 \le i \le n-1$, $$(f*g)_i = \sum_{j=0}^{n-1} f_j g_{(i-j)_n}.$$

We also define a multiplication * of matrices, as follows. Let $B \in Z^{n \times \bar{n}}$ and let $R \in Z^{n \times \bar{m}}$, say $$B=[b_0, \ldots b_{\bar{n}-1}] \text{ and } R=[r_0, \ldots, r_{\bar{m}-1}].$$

The $\bar{n} \times \bar{m}$ matrix $B^T * R$ is defined as $$B^T * R = \begin{bmatrix} b_0 * r_0 & b_0 * r_1 & \ldots & b_0 * r_{\bar{m}-1} \\ \vdots & \vdots & \vdots & \vdots \\ b_{\bar{n}-1} * r_0 & b_{\bar{n}-1} * r_1 & \ldots & b_{\bar{n}-1} * r_{\bar{m}-1} \end{bmatrix}$$

To discriminate between the ring and no-ring case, we use a Boolean parameter ring.

---
Algorithm 11: PST.CPA-PKE.Keygeneration()
---
Parameters Integers p, q, n, h, $\bar{n}$;
Boolean ring Requirement If ring then $\mu \le n\bar{n} \cdot \bar{m}$ else $\mu \le \bar{n} \cdot \bar{m}$
Input
Output - $pk \in \sum \times Z_p^{n \times \bar{n}}, sk \in (T_n(h))^{\bar{n}}$
$s \xleftarrow{\$} \{0, 1\}^{r_S}$
$S = f_S(s)$
$\sigma \xleftarrow{\$} \sum$
if ring
 then begin $a = f_{pol}(\sigma); B = \langle a*S \rangle_q$ end
 else begin $A = f(\sigma); B = (\langle AS \rangle_q)$ end ---
Algorithm 11: PST.CPA-PKE.Keygeneration()
---
$B = \text{Compress}_{p,q}(B)$
$pk = (\sigma, B)$
$sk = S$
return (pk, sk)

The next algorithm generates from a public key pk, a message m and a randomness variable ρ a cipher text c.

---
Algorithm 12: PST.CPA-PKE.Encryptwithrho(pk, m, ρ)
---
Parameters Integers p, t, q, n, $\bar{m}$, $\bar{n}$, μ:
Boolean ring Requirement If ring then $\mu \le n\bar{n} \cdot \bar{m}$ else $\mu \le \bar{n} \cdot \bar{m}$
Input $pk = (\sigma, B) \in \sum \times Z_p^{n \times \bar{n}}, m \in Z_{2^B}^{\mu}, \rho \in \{0,1\}^{r_R}$
Output $c = (U, v) \in Z_p^{n \times \bar{m}} \times Z_t^{\mu}$  $R = f_R(\rho)$
if ring
 then begin $a = f_{pol}(\sigma); U = \langle a*R \rangle_q$ end
 else begin $A = f(\sigma); U = \langle A^T R \rangle_q$ end
$U = \text{Compress}_{q,p}(U)$
if ring
 then $V = \text{Sample}_{\mu,n,\bar{n},\bar{m}}(\langle B^T * R \rangle_p)$
 else $V = \text{Sample}_{\mu,\bar{n},\bar{m}}(\langle B^T R \rangle_p)$;
$v = \text{Compress}_{p,t}\left(\left\{v + \left\lceil \frac{p}{2^B} \right\rceil \cdot m\right\}_p\right)$
$c = (U, v)$
return c The encryption algorithm generates from a public key pk and a message m a ciphertext c.

---
Algorithm 13: PST.CPA-PKE.Encrypt(pk, m)
---
Parameters Integers p, t, q, n, $\bar{m}$, $\bar{n}$, μ, Boolean ring
Input $pk = (\sigma, B) \in \sum \times Z_p^{n \times \bar{n}}, m \in Z_{2^B}^{\mu}$
Output $c = (U, v) \in Z_p^{n \times \bar{m}} \times Z_t^{\mu}$
$\rho \xleftarrow{\$} \{0, 1\}^{r_R}$
$c = \text{PST.CPA-PKE.Encryptwithro}(pk, m, \rho)$
return c The decryption algorithm retrieves, from a secret key sk and a ciphertext c, an (estimate for) the plaintext message m.

---
Algorithm 14: PST.CPA-PKE.Decrypt(sk, c)
---
Parameters Integers p, t, q, n, $\bar{m}$, $\bar{n}$, μ; Boolean: ring Requirement If ring then $\mu \le n\bar{m} \cdot \bar{m}$
else $\mu \le \bar{n} \cdot \bar{m}$
Input $sk = S \in (T_n(h))^{\bar{n}}, c = (U, v) \in Z_p^{n \times \bar{m}} \times Z_t^{\mu}$
Output $\hat{m} \in Z_{2^B}^{\mu}$
$v = \text{Decompress}_{p,t}(v)$
if ring
 then $X = \text{Sample}_{\mu,n,\bar{n},\bar{m}}(\langle S^T * U \rangle_p)$
 else $X = \text{Sample}_{\mu,\bar{n},\bar{m}}(\langle S^T U \rangle_p)$
$\hat{m} = \text{Compress}_{p,2^B}(v - X)$
return $\hat{m}$ 1.7.1 Framework Configurations The above algorithms allow us to enable several algorithms depending on configuration parameters.

LWR-based CPA-KEM For n=1 and k=d.
RLWR-based CPA-KEM For n=d and k=1.
LWR-based CCA-KEM For n=1 and k=d.
RLWR-based CCA-KEM For n=d and k=1.
LWR-based CCA-KEM-DEM For n=1 and k=d.
RLWR-based CCA-KEM-DEM For n=d and k=1.

Updating of the Share Matrix

Above a number of options are given to update a shared matrix based on a shared pool. The shared pool can take the form of a master matrix A_master, or a_master. The shared pool may indeed be represented as a matrix, but this is not necessary. Indexing the shared pool as a matrix makes certain permutations easier, e.g., cyclic permutations of rows or columns. More in general the shared pool may be regarded as a set of data in which the selections function can assign elements to elements in the shared matrix.

Below a number of embodiments of shared pools are given:

The shared public matrix A of dimension k×k used, e.g., in a LWE key exchange (and also, other LWE constructions) may be computed by applying a permutation π to a master matrix $A_{master}$ that is defined to have at least dimension k×k.

Assuming that $A_{master}$ is kept in memory, this approach allows for a faster way of computing a fresh A. This is of particular importance for servers that have to handle many connections. In embodiments, A is computed from $A_{master}$ of size less than k×k by applying multiple permutations. Thus, the size of $A_{master}$ is smaller and multiple permutations are applied on the same set. The latter has the advantage that a node does not need to either (i) compute the whole $A_{master}$ from a seed or (ii) keep $A_{master}$ in memory, which is just as large as the share matrix is. Instead a node could delete a shared matrix after it has been used, next time a shared matrix is needed, it can be constructed from the shared pool. In an embodiment, the shared pool comprises only a square root as many data as the shared matrix itself needs. For example, such a size supports partitioned the shared matrix up in k of each k entries. In an embodiment, a shared pool comprises about as many entries as the size of the first modulus q, e.g., less or equal than q or 2q, etc.

Some embodiments aim at improving the performance especially at the client (initiator) side in a KEX since the initiator has to compute and/or store less. This also improves the server (responder) side, but this improvement is relatively smaller. When applied to other lattice-based schemes, this ID can improve the performance of public-key encryption schemes or signature schemes since the public parameter A can also be computed faster given a couple of seeds.

The shared public matrix A of dimension k×k used in a LWE key exchange (and also, other LWE constructions) may be computed by applying a permutation π to a master matrix $A_{master}$. In an embodiment, the master matrix may have a dimension of at least k×k. But the shared matrix A could also be computed from $A_{master}$ of size less than k×k by applying multiple functions, that could be permutations. The size of $A_{master}$ is thus smaller and multiple functions (permutations) are applied on the same set. Assuming that $A_{master}$ is kept in memory, this approach allows for a faster way of computing fresh A. This is of particular importance for servers that have to handle many connections.

General Description:

A master matrix $A_{master}$ containing N elements is available in memory, N<k². The elements in $A_{master}$ can be computed from a random seed s by applying a pseudo-random function (PRF) to it. Master matrix $A_{master}$ is an example of a shared pool.

Figure 4:
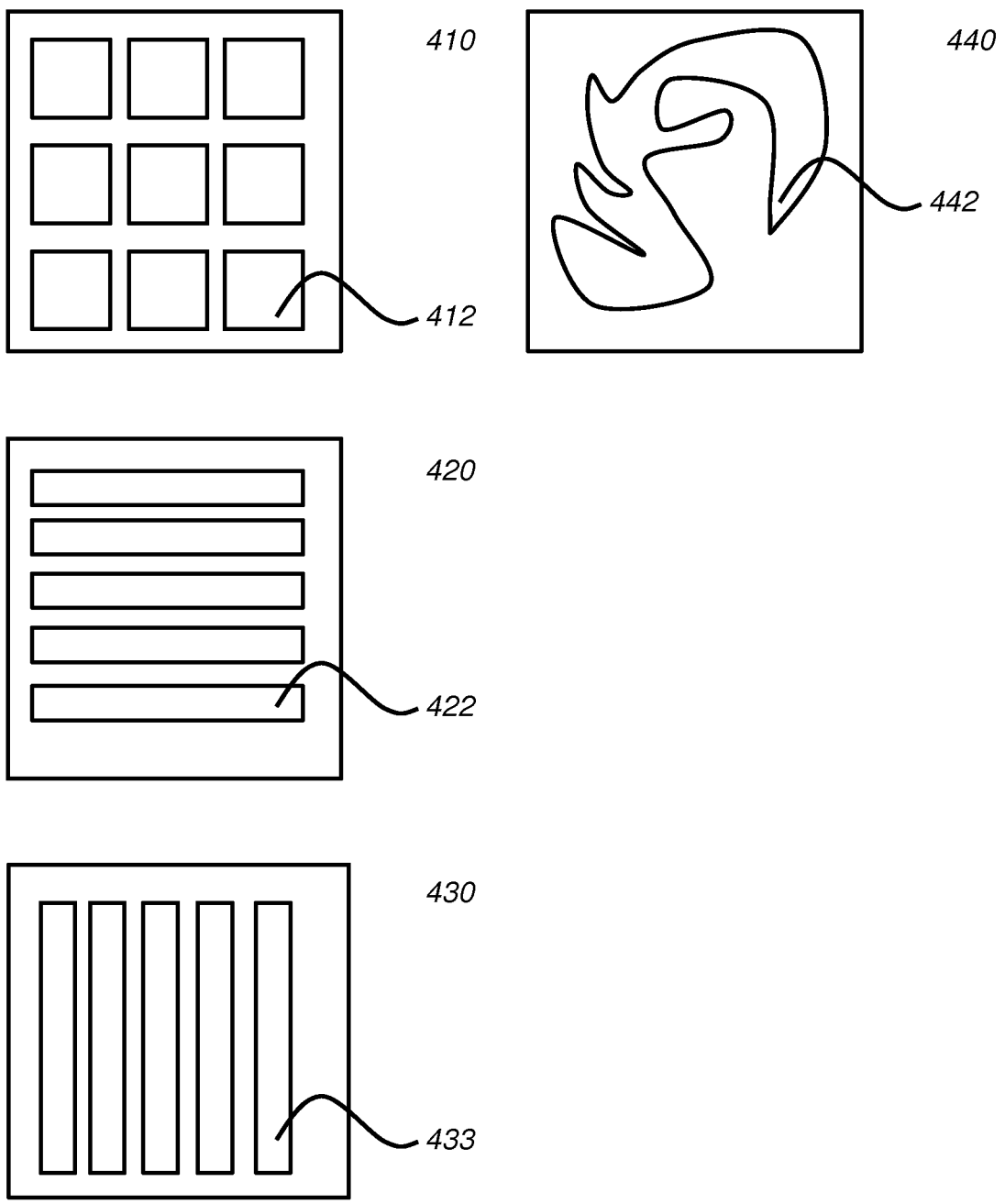

In an embodiment, the matrix A is partitioned in sets $B_i$, each set of size $N_B \le N$. A set can represent, e.g.:

A block in A
A row in A
A column in A
as depicted in FIG. 4.

The components in each set $B_i$ may be computed by applying a randomized function $\pi_i$ to $A_{master}$, i.e., $B_i = \pi_i(A_{master})$. This randomized function can be a permutation of the entries if the number of elements in $A_{master}$ and $B_i$ are equal. But it is enough if it picks up elements in $A_{master}$ in a random way.

The function $\pi_i$ could also pick up some elements in $A_{master}$ and substitute some others by random ones. For example, half of the entries of block $B_i$ are copied from values from $A_{master}$, the others are generated randomly. In yet another embodiment, the function $\pi_i$ picks up exactly sufficient entries from $A_{master}$ and applies a substitution function on each of the entries, the substitution function being a one-to-one function on the set $\{0,1,\ldots,q-1\}$. The function $\pi_i$ can also first permute entries, and apply a substitution function on the permuted entries.

About Parameters:

The elements in the shared matrix A may be are in [0, q−1]. The modulus q is around $2^{14}$ or $2^{16}$ in some embodiments. The size of A is k×k with k may be, e.g., 600-800. A suitable value for $N_B$ would be around q so that all elements are represented with high likelihood. If A is constructed from blocks, then each block could have size k'×k' with $k' < \sqrt{N_B}$, e.g., k' can be up to 128 for q=$2^{14}$.

SPECIFIC EMBODIMENTS

In an embodiment, a row-based permutation is proposed in which A is computed row-wise by applying a total permutation on A that applies a different permutation to each row in $A_{master}$.

In an embodiment, we compute each row $a_i$ in A with $0 \le i \le k-1$ by picking up elements of $A_{master}$, that in the following we denote $a_{master}$ (defined as a row containing $N_B$ elements). We describe two specific embodiments:

Embodiment #1: In a first embodiment, we compute it as an k-permutation of $N_b$. For instance, $\pi_i:a_i=a_{master}[r_i:(r_i+k-1)\%N_b]$ where $r_i$ is a random value. This leads to a total of $k^k$ randomized outputs. The notation [a:b] denotes all elements with indices from a to b. If b is smaller than a, all entries from a up to the end of the shared pool are taken, and all entries from the beginning of the pool, up to a. The notation m % $N_b$ denotes the integer m in $\{0, 1, \ldots, N_b-1\}$ that differs an integer multiple of $N_b$ from m.

Embodiment #2: In another example, $\pi_i:a_i[j]=a_{master}[(r_i+PRF(s|j))\%N_b]$, ie., the $j^{th}$ element in $a_i$ is obtained by taking an element in $a_{master}$ at random by applying a PRF that depends on a seed and j and shifting the elements a value $r_i$ that depends on the row. This leads to many randomized outputs:

$$k^k \binom{N_b}{k}$$

but it also requires the computation of a PRF for each row, which may be inefficient. The random values $r_i$ are examples of selection parameters.

Table below summarizes number of permutations and requirements on number of computed bits when generating $A_{master}$.

| Embodiment | # of randomized outputs | # computed bits by means of a PRF |
|---|---|---|
| #1 | $k^k$ | $N_b \log q + k \log k$ |
| #2 | $k^k \binom{N_b}{k}$ | $N_b \log q + k(\log q + \log k)$ |

From the above table, we can see that the number of randomize outputs is huge, but the number of bits that need to be computed by means of a PRF is much lower.

Usage in a Protocol:

Several parameters might need to be exchanged in a protocol. For example, one or more of:
the seed used to compute $A_{master}$
the seed used to compute the function $\pi_i$
the specification of the function (permutation) $\pi_i$ The method of updating the shared matrix A may be used in cryptographic protocols such as key exchanges, key encapsulation methods, public-key encryption systems, signature schemes, etc. Note that some embodiments also improve the performance especially at the client (initiator) side in a KEX since the initiator has to compute/store less. This also improves the server (responder) side, but this improvement is relatively smaller.

When applied to other lattice-based schemes, this can improve the performance of public-key encryption schemes or signature schemes since the public parameter A can also be computed faster given a couple of seeds.

Note also, that this could be applied to module-lattice if each module had a different public-parameter $a_i$ where $a_i$ represents in this case a polynomial over a given ring. Each of the public polynomials would be obtained from a master polynomial by applying a permutation.

FIG. 1 schematically shows an example of an embodiment of a key agreement network 100. Key agreement is an example of a cryptographic operation. The key agreement utilizes a number of elements, e.g., constructing a shared matrix, a private key matrix, a public key matrix, matrix multiplication, adding noise, etc., which are common to other types of cryptographic operations, e.g., public key encryption. In an embodiment, device 100 could be reconfigured for other types of cryptographic operations, e.g., as indicated above, or as indicated in the references. In an embodiment, device 100 could be reconfigured for multiple types of cryptographic operations. In any case, device 100 has the advantage that many different levels of structure and of difficulty are available. For example, the cryptographic operation may any one of: a key exchange (KEX) protocol, a key encapsulation method (KEM), public-key encryption (PKE), a digital signature. In an embodiment, the first network node may be configured to receive a selector, selecting a cryptographic operation from multiple different cryptographic operations. As an example, though, the embodiments below assume device 100 is configured to key agreement.

Shown in FIG. 1 are two network nodes in the system: a network node 110 of initiator type and a network node 210 of responder type. In an embodiment of the key agreement system the number of nodes may be larger, even much larger than two, e.g., more than a 1000 nodes, e.g., more than 10^6 nodes.

The difference between a network node of initiator or responder type is how it deals with reconciliation data. A network node of initiator type receives reconciliation data and applies it to obtain the shared key, whereas a network node of responder type generates reconciliation data and sends it the network node of initiator type. The responder type network node does not need reconciliation data to obtain the shared key. Typically, an initiator type will also initiate the key agreement protocol between the two network nodes, as this may reduce the number of rounds executed between the two networks node. However, it is not necessary; the key agreement protocol could also be initiated by a network node of responder type.

Furthermore, in an embodiment of the network node, the network node is configured to operate according to an initiator mode and according to a responder mode. For example, if the network node initiates a key agreement, e.g., sends a message to another network node signaling the start of the key agreement protocol, then the network node may switch to initiator mode. If the network node responds to a key agreement, e.g., receives a message from another network node signaling the start of the key agreement protocol, then the network node may switch to responder mode. Although this is convenient in practice, also this option is not strictly necessary; for example, in a key agreement system some modes may only be configured as initiator and some may only be configured as responder nodes. A consequence of this will be that some nodes cannot agree on a shared key together. For some networks this need not be a problem, e.g., in ad-hoc network, or ad-hoc wireless grids, etc., so long as sufficiently many pairs of network nodes can communicate and agree on a shared key.

Initiator node 110 comprises a communication interface 120. Responder node 210 comprises a communication interface 220. The communication interfaces may be arranged for digital communication with the other nodes in the key agreement system. It is not necessary though that all nodes in the system can be reached at all times.

Communication interface 120 and 220 are arranged for digital communication. For example, the communication interfaces may be arranged to communicate over a computer network. For example, the communication interface may be arranged for wireless, e.g., Wi-Fi, ZigBee, Bluetooth and the like, and/or wired communication, e.g., Ethernet, USB, and the like. The communication between nodes 110 and 210 may also be a combination of wired and wireless connections. For example, the nodes in system 100, including nodes 110 and 120 may comprise an electronic storage that contains a communication identifier, which uniquely identifies the node within system 100. For example, the communication identifier may be included in digital messages exchanged between nodes 110 and 210, e.g., to address the message. For example, the communication identifier may be an IP address, a MAC address, and the like.

The electronic network node is configured for a key exchange (KEX) protocol. The protocol involves exchanging messages between the nodes 110 and 210 over the communication interfaces 120 and 220, and performing computations on, e.g., data received from the other node. The execution of the key agreement protocol is implemented in a processor circuit, examples of which are shown below. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may also be wholly or partially be implemented in computer instructions that are stored at the network nodes and are executable by a microprocessor of the network node.

Initiator node 110 and responder node 210 are configured for a key exchange (KEX) protocol. KEX schemes involve the exchange of public-data, often termed public keys, by each party, that is then independently used by the other party along with their private data, often termed a secret-key, to calculate the common shared secret. An interesting feature of some embodiments is that the actual final, shared secret is never exchanged between the parties, not even in encrypted form, but is calculated independently by the two parties at each end. This results in a desirable feature known as forward-secrecy, which ensures that even the compromise of a party's long-term secret-keys by an attacker in the future would not compromise the secrecy of encrypted message exchanged in the past.

Embodiments of the inventions do not rely on a trusted third party to provide confidential communication. The communication channel between communication interfaces 120 and 220 need not necessarily be a secure channel. Attackers may be able to eavesdrop on the communication channel. Even so, the key that is agreed between nodes 110 and 210 may be secure. If the communication channel is protected against alterations, a degree of authentication may be obtained in so far as provided by the channel. However, if the channel between communication interfaces 120 and 220 is not protected against alterations, no KEX scheme will achieve authentication. To obtain authentication, embodiments may be combined with any known authentication mechanism, e.g., an implicit authentication mechanism, e.g., using certified public-keys, or an explicit authentication mechanism, e.g., using digital signatures.

Initiator node 110 comprises a shared matrix unit 130. Responder node 210 comprises a shared matrix unit 230. The shared matrix units 130 and 230 are configured to obtain a shared matrix (A) that is shared between the two nodes. There are many ways to ensure that the same matrix is shared between nodes 110 and 210, especially given the fact that the matrix A does not necessarily have to be kept private to the nodes 110 and 210.

The structure of the shared matrix A may be defined with a difficulty parameter d, and structure parameter n. Shared matrix unit 130 and shared matrix unit 230 may be configured to receive as input the difficulty parameter d, and the structure parameter n. Although this has as an advantage that the device can support many types of cryptographic underlying problems, this is not necessary. The structure of A, e.g., its size, and the degree of its polynomials (if any), may also be pre-determined.

Note that both units use a shared matrix with the same difficulty parameter d, and structure parameter n. These numbers d and n determine the size and the type of elements of matrix A. For example, the difficulty parameter d, and structure parameter n may be set through an API, e.g., by an application that uses device 110 and 210, e.g., for protected communication. The application can decide on the required difficulty and structure, and instruct device 110, and/or 250 by, e.g., a function call.

Entries in the shared matrix A are selected modulo a first modulus q, modulo a reduction polynomial (f) of degree equal to the structure parameter (n). If n=1, the entries are integers; if n>1, they are polynomials. The first modulus q and the reduction polynomial f are also shared between nodes 110 and node 210, e.g., communicated or predetermined. Shared matrix A is typically a square matrix k×k, e.g., of dimension k. It is not necessary though that A is square. Instead, A can be rectangular. The sizes of the private key matrices are then chosen to be compatible with the sizes of A.

The number of rows and columns k is equal to the difficulty parameter d divided by the structure parameter n. If n=d, the matrix A has a single polynomial entry. A practical choice for the reduction polynomial f is, e.g., $x^n+1$, or $x^n-1$.

It is preferred that the structure parameter n divides the difficulty parameter d, so that the dimension k can be computed. However, in an embodiment, k is obtained by rounding the difficulty parameter d divided by the structure parameter n, e.g., rounding to the nearest integer, rounding up, or rounding down.

In an embodiment, the structure parameter n is restricted to be a prime number, but this is not necessary. In an embodiment, the structure parameter n is a power of 2, and the first modulus q is a prime number, but this is not necessary either.

Nodes 110 and 210 have a shared pool 131. The shared pool being shared with the second network node and comprising multiple integers and/or polynomials for use in an entry of the shared matrix. The shared pool thus can be viewed as a vector of integers and/or polynomials. For example, nodes may be manufactured with access to a shared pool. A preferred way to obtain a shared pool however is to generate a shared pool. This has the advantage that different pairs of nodes can have different shared pools. For example, the nodes 110 and 210 may be obtained to generate the shared pool by a deterministic pseudo random number generator. The random number generator is seeded from a shared seed. For example, one of the devices, e.g., device 110 or device 210 may generate a seed and send it to the other party. For example, the first party to send a public key matrix may send a seed to generate the shared pool with it, and from that the shared matrix. For example, both may generate a seed and send it to the other party. The seed used for generated being obtained by combining both seeds, e.g., by adding them.

Once the shared pool has been generated it can be retained, e.g., temporarily in an electronic memory, or in a longer-duration storage, e.g., on a magnetic recording device, such as a hard disk, or a non-volatile memory. Keeping the shared pool means that it does not need to be generated again. In an embodiment, the shared pool stays the same over multiple key exchanges. But the shared pool may also evolve somewhat. For example, at each new key generation a fixed number of entries in the pool may be discarded and a new set of number generated, e.g., also from a seed, e.g., a new seed. This keeps overhead under control but does ensure that in the long run the shared pool and thus the entries in the shared matrix are renewed. For example, the number may be 10, etc.

Entries in the shared matrix or coefficients of entries are selected from the shared pool. There are a few options. The shared matrix may comprise integers in which case the shared pool also comprises integers. The shared matrix may comprise polynomials, in this case the shared polynomial comprises either integers, which may be selected as coefficients for the polynomials in the shared matrix, or the shared pool may comprise polynomials, in which case the entries in the shared pool may be used directly for entries in the shared matrix. In these embodiments, the entries in the shared pool are preferably modulus the first modulus q, although this is not strictly necessary. Likewise, if the entries in the shared pool are polynomials, they are preferably modulo the shared modulus q and the shared reduction polynomial f For most applications, it is not necessary, that the seeds, shared pool, shared matrix, selection parameters, etc., are secret, although they could be public The size of the shared pool may be smaller than the size of the shared matrix. For example, the storage size of the shared matrix may be proportional to the number of entries in the shared matrix time, possibly times the degree of the reduction polynomial minus 1. The size of the shared pool may be proportional to its number of entries, possibly times the degree of the reduction polynomial minus 1. In an embodiment, the size of the shared pool is less than the size of the shared matrix, e.g., less or equal to half the size of the shared matrix. In an embodiment, the size of the shared pool is less than the size of the shared matrix, e.g., less or equal to the squared root of the size of the shared matrix; this has the advantage that the shared matrix can be divided into k parts which are equal or about equal to the size of the shared pool. In an embodiment, the number of entries in the shared pool is less than the first modulus q, or a small multiple thereof, e.g., 2q, 3q, etc. An advantage of the latter is that about all elements modulo q are likely to be present in the shared pool, and thus will be about equally represented in the shared matrix.

In an embodiment, a shared pool is larger in size than the shared matrix, but the node uses the same shared pool for multiple shared matrices. In fact, a shared pool may even be used with multiple different second nodes.

An advantage of a shared pool, is that it is low-cost to update the shared matrix. For example, merely selection parameters may be sent or exchanged, on the basis of which a new shared matrix can quickly be selected from the shared pool. In particular, in some embodiments, no or few random functions are required.

In an embodiment, the nodes obtain one or more selection parameters which are shared with the other node network node. The selection parameters could be predetermined, for example, the nodes may have access to a sequence of selection parameters and use the next one or next some ones to generated the shared matrix. Such selection parameters could also be selected by one node and communicated to the other. The selection parameters could also be selected by both nodes and communicated to the other after which they are combined, e.g., added, e.g., XOR-ed.

The selection parameters are used to control selection functions, which pick, e.g., select the entries in the shared matrix from the shared pool.

For example, the shared matrix units 130 and 230 may be configured with one or more selection functions. The selection functions assign an integer, polynomial, and/or polynomial-coefficient from the shared pool to an entry in the shared matrix, the particular integer, polynomial, or polynomial-coefficient assigned by a selection function being dependent on the selection parameter.

For example, the selection function may be functions $g_i(r_i, j)$ which take as input a selection parameter $r_i$ and an index j into the shared pool, or part thereof. The output of the selection function, may be a pair (x, y) which indicates an entry in shared matrix A. The output of the selection function, may be a pair (x, y, t) which indicates an entry (x, y) in shared matrix and a degree t of a coefficient of a polynomial in the entry. In this case the function $g_i(r_i, j)$ is evaluated for different values of the index j for, say, for index from j=0, ..., N, and the entry in the shared pool for index j is assigned to the output of the selection function.

For example, the selection function may be functions $g_i(r_i, x, y)$ or $g_i(r_i, x, y, t)$ which take as input a selection parameter $r_i$ and a pair (x, y) which indicates an entry in shared matrix or a triple (x, y, t) which indicates an entry (x, y) in shared matrix and a degree t of a coefficient of a polynomial in the entry. The output of the selection function may be an index j into the shared pool, or part thereof. In this case the function $g_i(r_i, j)$ is evaluated for different entries in the shared matrix, and/or for different values for t and the entry in the shared pool is assigned to the entry in the shared matrix. A shared pool may be represented as a matrix itself, in which case index j may be represented as a pair of indices.

For example, the selection function may be permutation. The permutation is applied to the shared pool or part thereof, and the result is assigned according to a predetermined sequence, e.g., linear, to the entries in the shared matrix, e.g., integers, polynomials or coefficients.

In an embodiment, the shared matrix A is partitioned into sets. To each set a selection function maps the shared pool or part thereof to the set, in dependence on at least part of the selection parameter. Examples of partitioning are shown in FIG. 4. Shown in FIG. 4 are four shared matrices A: 410, 420, 430 and 440.

In shared matrix 410, the sets are blocks of shared matrix A. For example, a block is at least 2×2 or larger. A block, may, but need not, be square. One set is referenced 412.

In shared matrix 420, the sets are rows of shared matrix A. One set is referenced 422.

In shared matrix 430, the sets are rows of shared matrix A. One set is referenced 432.

In shared matrix 440, the sets are a random selection of entries of shared matrix A. One set is referenced 442. For example, also in this case the set may have a size equal to 1/k times the number of entries in A. For example, set 442 may comprise k entries, e.g., integers. Set 442 may even be a selection of 1/k times the number of coefficients in A. Assigning of coefficients to the sets, e.g., set 442, may be random. A coefficient of a polynomial entry in A may be distributed of one or over more than one set.

A selection parameter $r_i$ may for example, select a random index in the shared pool. Next the consecutive string of integers in the shared pool may be assigned to the entries to which function $g_i$ is assigned. A selection function may indicate that a particular pre-determined permutation should first be applied that many times. These may be combined. For example, a random permutation of the entire shared pool may be fixed in the nodes. A first selection parameter $r_0$ indicates that the fixed permutation should be executed $r_0$ times, after this $r_i$ may be used for function $g_i$, e.g., as an index.

A selection parameter may be an input to a linear congruential generator, the linear congruential generator assigned indices in the shared pool to indices in a set of the shared matrix. For example, the selection parameter may be multiplier in the recurrence relation of the linear congruential generator. Preferably, the selection parameter is relatively prime with the number of entries in a set. For example, a selection parameter may also be an increment. The linear congruential generator may generate as many numbers as there are in the set and permute all or part of the shared pool according to it. Note that the overhead of a linear congruential generator is much lower than a cryptographic random function.

A selection function may also comprise a cryptographic random function for example based on selection parameters r and s the entries in the shared pool with index (r+Prf(s|j)) modulo the size of the shared pool may be mapped to an entry with index j of a set of A, e.g., in a row or column of the shared matrix, where Prf denotes a Pseudo random function, and (S|j) denotes the concatenation of s and j.

In yet another embodiment, after application of the selection function to the pool, an additional function S is applied. Examples of such a function S are element-wise application of a one-to-one function on $\{0, 1, \ldots, q-1\}$, or the substitution of some matrix entries by randomized entries.

In an embodiment, the shared matrix units 130 and 230 are configured to select all integers, polynomials, and/or polynomial-coefficients in the shared matrix from the shared pool. This has the advantage that a new version of the shared matrix is quickly available. However, any bias that is present in the shared pool, may be reflected in the shared matrix. For very high security, it may be desired to avoid this. There are several ways to do this. For example, the contents of the shared pool may be updated over time. For example, after each new shared matrix that is generated, the contents of the shared pool may be updated, e.g., by generating a number of new entries with a random number generator. This may introduce the risk that the shared pool may run out of sync between the first and second node though. This risk is reduced by using the selection parameters as a seed for updating the shared pool. For example, the shared pool may be updated before generating the shared matrix. Only if successful key generation took place are the changes to the shared pool kept, otherwise the shared pool is reverted to its previous status. If successful key generation is not possible, the shared pool may also be updated by complete re-generation, e.g., according to a shared pool re-generation protocol, which may comprise the exchange of seeds for the regeneration.

Other ways to reduce the dependence on a particular shared pool is to take only part of the shared matrix from the shared pool. For example, in an embodiment, part of the integers, polynomials, and/or polynomial-coefficients in the shared matrix are selected from the shared pool, and to generate the remaining part of the shared matrix. For example, the nodes may exchange a seed, e.g., in a similar way as a seed for generating the shared pool is exchanged, and/or in a similar way a selection parameter is exchanged. The seed is used to generate part of the shared matrix. For example, the predetermined entries in the shared matrix may be updated. For example, the predetermined places may have at least one entry in each row and/or in each column. In an embodiment, coefficients or entire polynomials may be updated. In an embodiment, a number of entries/coefficients are selected randomly, e.g., selected by a random number generator, seeded with the seed or a selection parameter, etc.

The number of entries/coefficients to replace or generate may be a fixed number, say at least 10, or at least 100, etc. The number may be proportional to the shared matrix, e.g., at least the square root of the number of entries/coefficients is not taken from the shared pool, but generated and/or replaced.

Instead of taking only part of the entries from the shared matrix, one may also select the entire shared matrix from the shared pool first, but then substitute part of it for other values. For example, a substitution or randomization step may amend the shared matrix before it is used for key exchange. For example, one or more of the entries may be selected, e.g., predetermined or randomly selected, or even by protocol, and replaced by a randomly generated entry, e.g., according to the seed, etc. Alternatively, a mapping may be applied to some or all of the entries in the shared matrix. For example, an entry-wise application of a one-to-one mapping on $\{0, 1, \ldots, q-1\}$ may be applied to one, more than one, or all entries. The randomization function may be applied to the same number as the substitution/replacements are, but the randomization function may also be applied to more, e.g., to all entries/coefficients.

Below a key exchange protocol is further explained. In this embodiment, it is assumed that the shared matrix comprises integers modulus the first modulus q. However, in other embodiments of a key exchange protocol, the shared matrix, and private key comprise polynomials modulo the modulus q and the first reduction polynomial f. The public key matrix may be modulo the second modulus p and the reduction polynomial. Instead of using rounding, one may also use other sources of noise. The Initiator node 110 comprises a private key matrix unit 140. Responder node 210 comprises a private key matrix unit 240. Private key matrix unit 140 is configured to generate a private key matrix $S_I$; Private key matrix unit 240 is configured to generate a private key matrix $S_R$. The entries in the private key matrices are polynomials modulo f. If the degree of f is 1, then practically speaking the entries are integers.

Generally speaking, the private key matrix chosen randomly. For example, the entries in the private key matrix ($S_I$, $S_R$) may be chosen from a uniform random probability distribution. The distribution may also be non-uniform, e.g., wherein the probability of a zero entry is larger than the probability of a non-zero entry, e.g., at least twice as large.

Various restriction may be imposed on the private key matrix, e.g., to improve security or to reduce its data size. The private key matrix ($S_I$, $S_R$) may be chosen uniformly random from candidate private key matrices, e.g., within the restrictions. For example, in an embodiment, the coefficients of elements in the private key matrix are bounded in absolute value by a bound (s), e.g., wherein said bound is 2 (s=2), or wherein the bound is 1 (s=1), the latter corresponding to signed binary. For example, the columns and/or rows of the private key matrix ($S_I$, $S_R$) have a fixed or bounded hamming weight ($h_s$).

The inventors found that, surprisingly, choosing the bound small has a dual advantage: matrix multiplications with the private key matrix are faster, and the distance between the raw keys computed at each side is smaller (see below). The latter means that less reconciliation data is needed and/or the chance of a failure in the protocol because the nodes agreed on a different key is smaller.

In an embodiment, the bound s is 1 (s=1). That is, the entries of a private key matrix only have coefficients that are the values −1, 0 and 1. We will refer to this also as 'signed binary'.

The dimensions of the private key matrices are chosen so that they can be multiplied with matrix A. For example, if A is k by k, then the private key matrix of the initiator node may be an k by $\bar{k}$ matrix. The size of $\bar{k}$ and k are chosen large enough to obtain a sufficient number of bits in the shared key, and to obtain a sufficiently high security level.

In addition to restricting the size of the entries of the private key matrix further advantages are obtained by restricting the number of non-zero elements. We will refer to the hamming weight of a column or row of a matrix as its number of non-zero entries The inventors investigated different ways to restrict the hamming weight of private key matrices. It is generally sufficient to restrict hamming weight for either the columns or for the rows, depending on whether the private key matrix is left or right multiplied with matrix A. For example, if the private key matrix is right-multiplied with the matrix A (e.g., As) it is sufficient to restrict hamming weight in columns of the private key matrix.

For example, an upper bound may be selected for the hamming weight of the columns and/or rows of a private key matrix. The upper bound may the same for all columns and/or rows. In an embodiment, the columns and/or rows of the private key matrix ($S_I$, $S_R$) have the same fixed hamming weight.

Security is improved if—subject to the conditions—a private key matrix is chosen uniformly random from the candidate private key matrices, that is from the matrices that satisfy the chosen requirements, e.g., as to the bounds on entries and the hamming weights in columns or rows. For example, if one desires to enforce the condition that the hamming weight of each column is 50, then it is advantageous to select a private key matrix from the set of all matrices with the correct dimensions that have hamming weight of 50 for each column. Efficient algorithms to select a uniformly random bit string of any desired hamming weight are known.

A different way to restrict the hamming weight of the private key matrices is to choose the columns and/or rows of a private key matrix ($S_I$, $S_R$) from a probability distribution. For example, entries in the private key matrix ($S_I$, $S_R$) may be chosen from a non-uniform probability distribution, wherein the probability of a zero entry is larger than the probability of a non-zero entry. In an embodiment, the probability distribution is chosen so that it gives a predetermined expected hamming weight for the columns and/or rows. For example, to choose a column of length n and expected hamming weight $h_s$ one may select each entry as non-zero with probability $h_s/n$. The non-zero entry may be chosen as 1 or −1, e.g., with equal probability.

Initiator node 110 comprises a public key matrix unit 150. Responder node 210 comprises a public key matrix 250. The public key matrix unit computes a public key matrix from matrix A and a private key matrix S.

The terms public and private are intended to convey that the shared key cannot be obtained only with knowledge of public information, or not without knowledge of some private information. There is no requirement though that public information is actively shared. For example, the key agreement protocol could be executed over a (presumed) secure channel, which keeps the public keys secure from eavesdroppers. In this case the key agreement protocol provides an additional layer of security in case the security of the channel is breached.

The public key matrix unit computes a public key matrix P ($P_I$, $P_R$ for the initiator and the responder respectively) by computing a matrix product between the shared matrix (A) and the private key matrix ($S_I$, or $S_R$ respectively) modulo the first modulus (q) and f, obtaining a matrix product and adding noise.

Note, this intermediate matrix multiplication is not revealed. Knowledge of the shared matrix A and the result of this matrix multiplication would reveal the private key, as it may be computed by inverting the matrix A.

Adding noise may be done by selecting error terms, or noise terms and adding them to the entry of the above matrix product. For example, the noise may be selected from a Gaussian distribution with mean 0. A preferred way to add noise is scaling the intermediate matrix product down, e.g., scale the coefficients down.

In an embodiment, the public key matrix unit scales the entries in the matrix product down to a second modulus p. The second modulus p is smaller than the first modulus q. A scaled entry is equal to the unscaled entry multiplied with the second modulus (p), divided by the first modulus (q) and rounded to the nearest integer. For example, if x is an unscaled entry modulo q in the matrix product, the scaled entry may be selected as $$\left\lfloor \frac{p}{q} x \right\rceil,$$

wherein $\lfloor\ \rceil$ represents the nearest integer. After the scaling operation, it is no longer straightforwardly possible to compute the private key from the public key and the matrix A.

Entries in a public key matrix may be represented as polynomials with coefficients in the interval [0, p−1]. Entries in a private key matrix may also be represented as polynomials with coefficients in the interval [0, p−1]. There is an advantage to choose the coefficients in the interval $$\left[-\frac{p}{2}, \frac{p}{2}\right]$$

to reduce the size of the integers for subsequent multiplications. As pointed out above, the private key matrix may also have coefficients chosen in the interval [−s, s] or even [0,s].

The multiplication of matrix A and a private key matrix S is done modulo the first modulus q and f. For this end the network node may comprises a modular reduction unit for reducing modulo q and modulo f. If the coefficients in the private key matrix S are small, e.g., bounded by 1, or bound by 1 in absolute value, the modular reduction may be simplified; during the matrix multiplication, each time a coefficient becomes larger than q or smaller than 0 the result is brought back to the interval 0 to q−1 by subtracting or adding q.

Both the initiator node and the responder node send their public key matrix to the other node, e.g., using the communication interfaces 120 and 220. The inventors found at least three advantages that are realized by scaling down the matrix product. First of all, generation and explicit addition of noise into the matrix product is avoided. Introducing noise requires the computation of a probability distribution, e.g., a Gaussian distribution. These are relatively computationally intensive. Second, communication requirements are reduced. Since second modulus p is smaller than the first modulus q, fewer bits are needed to represent an entry of the public key matrix than of a private key matrix. Third, computations that involve the public key matrix are smaller since they involve smaller numbers. It is surprising that a single measure simultaneously provides three advantages.

It is strongly preferred that the second modulus p divides the first modulus q. Interestingly, the inventors found that neither the first nor the second modulus needs to be a prime number. In fact, it was found that choosing the second modulus (p) and/or the first modulus (q) as a power of 2 has the advantage that the public and private keys are uniformly distributed. In an embodiment both the first and second modulus is a power of 2.

In an embodiment, we further require that $2^{B+b_h}|p$ in addition to moduli p and q that are powers of two. This causes uniform shared keys even if the reconciliation data is observed. B is the number of shared key bits extracted per entry of raw key.

The sizes of the moduli need not be very large. For example, in an embodiment the second modulus has as bit size of 12 or more, and/or the first modulus has as bit size of 8 or more. Larger or smaller sizes are possible depending on the security requirements. In an embodiment, q is in the range of $2^{12}$ and $2^{15}$, p is in the range $2^7$ and $2^9$ (inclusive). The values of p and q may be chosen larger or smaller as security demands dictate.

Initiator node 110 comprises a shared key unit 160. Responder node 210 comprises a shared key unit 260. The shared key units are different in the sense that they either generate and transmit, or receive and apply the reconciliation data.

Both shared key unit 160 and shared key unit 260 are configured to compute a raw key 162, 262 as a matrix product between the received public key of the other node and the private key matrix of the network node itself. The product is computed modulo the reduction polynomial f. If scaling is used, the latter is computer also modulo the second modulus (p). The dimensions of the matrices, and matrix multiplications are chosen such that if the scaling operation were omitted both parties would compute an identical raw key. That is, identical keys would result without adding noise, and all computations were done modulo q and f. However, due to the noise both raw keys need not be identical. Computing the raw key may be done modulo p. The network nodes may comprise a modular unit for reducing the result of the multiplications modulo p.

Shared key unit 260 of responder node 210 is arranged to obtain the shared key 266 and reconciliation data 264 from the raw key 262, and to send the reconciliation data 264 to the initiator network node 110. Reconciliation data may take the form of one or more bits in the raw key, e.g., bits from coefficients. Bits chosen as reconciliation data are ignored for the purpose of generating a key. The references contain various examples of reconciliation data.

Shared key unit 260 chooses some bits from the entries of the raw key to form a key from. For example, the chosen bits may be concatenated. In an embodiment, the chosen bits are input to a key derivation function (KDF), e.g., a cryptographic hash function. An example of a KDF is given in e.g., the CMLA_KDF from CMLA Technical Specification, Version: V1.43-20131218, or the KDF function defined in "DRM specification", OMA-TS-DRM-DRM-V2_0_2-20080723-A, Open Mobile Alliance™, Version 2.0.2, section 7.1.2, etc. The key derivation function may be applied to the entries of key bits in the raw key, e.g., obtained by the rounding function, e.g., after concatenation, or from the outputs from the reconciliation function, e.g., also after concatenation.

Some bits that are not chosen as key bits may be selected as reconciliation data. Finally, some bits may be discarded altogether. The key reconciliation data obtained from the raw key by shared key unit 260 is sent to the initiator node 110.

Shared key unit 160 is configured to receive the reconciliation data 164 (h) of the second network node, and to compute a shared key by applying a reconciliation function to the received reconciliation data and the raw key matrix 162. For example, the reconciliation function may be applied to each of the entries in the raw key 162 and corresponding part of reconciliation data. For example, if the reconciliation data 164 was part of the raw key generated by responder unit 210, the initiator node may select a raw key that could have been obtained by node 210 and is compatible with the received reconciliation data, e.g., has the same middle bits as received.

One could reuse one of the matrix A and the private key matrix for multiple executions of the key agreement protocol (if both are the same one would obtain the same shared key). This would reduce communication overhead, especially if matrix A is reused. However, the inventors realized that there is no need to reuse any of matrix A and private key matrix since no authentication is connected to these elements. In a preferred embodiment, a fresh matrix A and a fresh private key is obtained for each new key exchange. This has the advantage that attackers do not have the option to observe additional information by observing multiple executions of the protocol. Moreover, forward secrecy is improved.

After the protocol is completed and both nodes have computed a shared key, one of the nodes may send a key confirmation message to the other node to verify that they have agreed on the same key. For example, a key confirmation message may be a hash of the shared key, an encryption of a fixed value, an encryption of a random value together with the random value. Key confirmation may also be performed using a challenge response protocol. One may also choose to omit key confirmation. If the parties obtain a different shared key, then subsequent communication performed between them will fail. For example, the shared key may be used to encrypt and/or authenticate further communications, e.g., digital messages. If they arrived at a different shared key, then decryption and/or verification may fail.

In the various embodiments, the communication interface may be selected from various alternatives. For example, communication interface may be a network interface to a local or wide area network, e.g., the Internet, a storage interface to an internal or external data storage, a keyboard, etc.

The network nodes may comprise an electronic storage, e.g., to store intermediate data such the matrix A, the public and private key matrices, and the shared key, etc. The storage may be implemented as an electronic memory, say a flash memory, or magnetic memory, say hard disk or the like. The storage may comprise multiple discrete memories together making up storage. The storage may also be a temporary memory, say a RAM. In the case of a temporary storage, the storage may use some means to obtain common parameters before use e.g., by obtaining them over an optional network connection (not separately shown).

Typically, the devices 110 and 210 each comprise a microprocessor (not separately shown in FIG. 1) which executes appropriate software stored at the devices 110 and 210; for example, that software may have been downloaded and/or stored in a corresponding memory, e.g., a volatile memory such as RAM or a non-volatile memory such as Flash (not separately shown). Alternatively, the devices 110 and 210 may, in whole or in part, be implemented in programmable logic, e.g., as field-programmable gate array (FPGA). Devices 110 and 210 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

In an embodiment, a network node comprises a communication interface circuit, a shared matrix circuit, a private key matrix circuit, a public key matrix circuit, and a shared key circuit. The circuits implement the corresponding units described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

Figure 2:
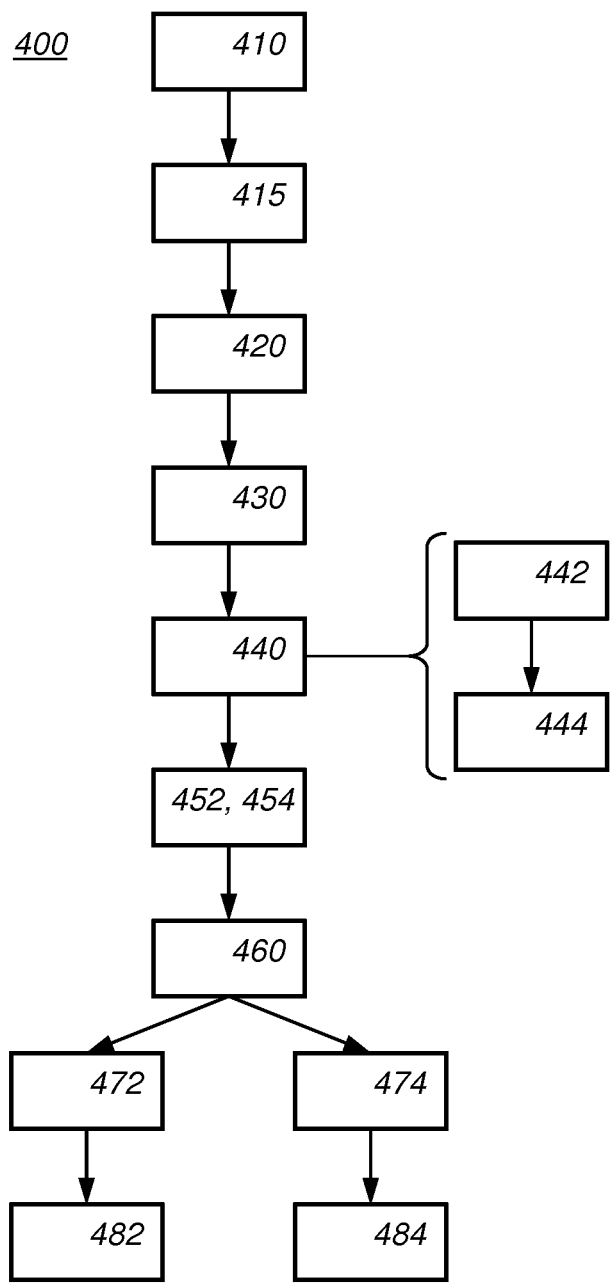

FIG. 2 schematically shows an example of an embodiment of an electronic key exchange method. The method may be executed by a first electronic network node, such as initiator node 110 or responder node 210.

Method 400 comprises arranging (410) digital communication between the first network node and a second network node, obtaining (420) a shared matrix (A), the shared matrix being shared with the second network node through the communication interface, entries in the shared matrix A being integers, preferably integers modulo a first modulus q, and/or entries in the shared matrix (A) being and/or polynomials, obtaining the shared matrix (A) comprises obtaining one or more selection parameters shared with the second network node, selecting integers, polynomials, and/or polynomial-coefficients from a shared pool, the shared pool being shared with the second network node and comprising multiple integers and/or polynomials for use in an entry of the shared matrix, wherein the selecting is done according to one or more selection functions, a selection function assigning an integer, polynomial, and/or polynomial-coefficient from the shared pool to an entry in the shared matrix, the particular integer, polynomial, or polynomial-coefficient assigned by a selection function being dependent on the selection parameter, generating (430) a private key matrix ($S_I$), entries in the private key matrix being integers modulus (q) and/or integer polynomials modulo the reduction polynomial (f), generating (440) a public key matrix ($P_1$) by computing (442) a matrix product between the shared matrix (A) and the private key matrix ($S_I$) modulo the first modulus (q) and/or modulo the reduction polynomial (f) obtaining a matrix product, and adding noise (444) to the entries in the matrix product sending (452) the public key matrix of the first network node to the second network node, receiving (454) a public key matrix ($P_R$) of the second network node, computing (460) a raw key as a matrix product between the received public key of the second node and the private key matrix of the first network node modulo the second modulus (p), If the first network node is operating according to an initiator mode, then the first network node performs the following further elements.

receiving (472) reconciliation data (h) of the second network node, computing (482) a shared key by applying a reconciliation function (rec) to the received reconciliation data and the raw key.

If the first network node is operating according to a responder mode, then the first network node performs the following further elements.

obtaining (474) the shared key and reconciliation data from the raw key, sending (484) the reconciliation data to the first network node.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 3A:
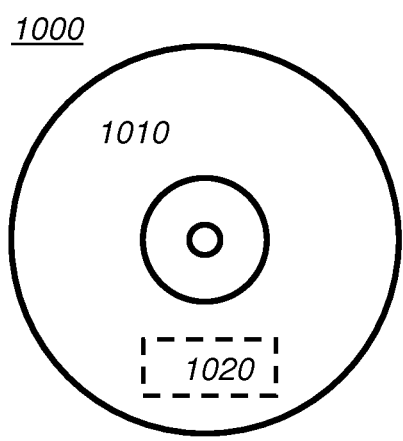

FIG. 3a shows a computer readable medium 1000 having a writable part 1010 comprising a computer program 1020, the computer program 1020 comprising instructions for causing a processor system to perform a cryptographic operation, e.g., a key agreement method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said key agreement method 400, or another cryptographic operation(s) according to an embodiment.

Figure 3B:
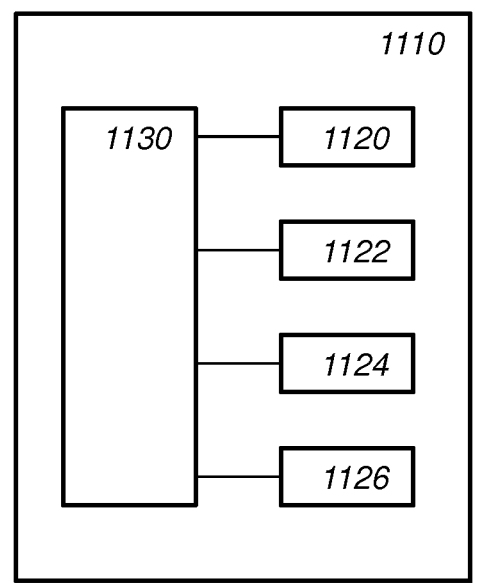

FIG. 3b shows in a schematic representation of a processor system 1140 according to an embodiment, e.g., to implement one or more cryptographic operations. The processor system comprises one or more integrated circuits 1110. The architecture of the one or more integrated circuits 1110 is schematically shown in FIG. 3b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, a network node may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the verification device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A first network node comprising:
   a communication interface circuit, wherein the communication interface circuit is arranged to communicate with a second network node; and
   a processor circuit,
   wherein the processor circuit is arranged to obtain a shared matrix (A),
   wherein the shared matrix (A) is shared with the second network node through the communication interface circuit,
   wherein the shared matrix (A) comprises a plurality of shared matrix entries,
   wherein at least a portion of the shared matrix entries are integers, and/or integer polynomials,
   wherein obtaining the shared matrix (A) comprises:
      obtaining one or more selection parameters shared with the second network node; and
      selecting integers, polynomials, and/or polynomial-coefficients from a shared pool,
   wherein the shared pool is shared with the second network node,
   wherein the shared pool comprises a plurality of shared pool entries,
   wherein the shared pool entries comprise integers and/or polynomials for use as an entry of the shared matrix (A),
   wherein the selecting is done according to one or more selection functions,
   wherein a selection function assigns an integer, polynomial, and/or polynomial-coefficient from the shared pool to an entry in the shared matrix (A),
   wherein the particular integer, polynomial, or polynomial-coefficient assigned by a selection function is dependent on the selection parameter,
      wherein the processor circuit is arranged to generate a private key matrix ($S_I$),
      wherein the private key matrix ($S_I$) comprises a plurality of private key entries,
      wherein at least a portion of the private key entries are integers and/or integer polynomial,
   wherein the processor circuit is arranged to generate a public key matrix ($P_I$) by computing a matrix product between the shared matrix (A) and the private key matrix ($S_I$) obtaining a matrix product,
   wherein the matrix product has a plurality of matrix product entries,
   wherein the processor circuit is arranged to add noise to the matrix product,
   wherein the processor circuit is arranged to send the public key matrix of the first network node to the second network node.

2. The first electronic network node as in claim 1,
   wherein at least a portion of the shared matrix entries are integers modulo a first modulus (q) and/or integer polynomials modulo a first modulus (q) and modulo a reduction polynomial (f),
   wherein the private key entries are integers modulo the first modulus (q) and/or integer polynomials modulo the first modulus (q) and modulo the reduction polynomial (f),
   wherein the private key matrix ($S_I$) is computed modulo the first modulus (q) and/or modulo the first modulus (q) and the reduction polynomial (f).

3. The first network node as in claim 1, arranged to obtain a different shared matrix (A) for each new key exchange.

4. The first network node as in claim 1,
   wherein the shared matrix (A) and shared pool comprise integers or polynomials,
   wherein the selection polynomials select integers or polynomials from the shared pool,
   wherein the shared pool comprises fewer shared pool entries than the shared matrix entries.

5. The first network node as in claim 1,
   wherein the first network node is arranged to obtain the shared pool by generating a random seed and sending the random seed through the communication channel to the second node,
   wherein the first network node and the second network node use the random seed to seed a deterministic pseudo random number generator,
   wherein the deterministic pseudo random number generator generates the shared pool.

6. The first network node as in claim 1,
   wherein at least a portion of the shared matrix entries and at least a portion of the shared pool are integers modulo a first modulus (q)
   wherein at least a portion of the shared matrix entries are integer polynomials modulo a reduction polynomial (f) and at least a portion of the shared pool entries are integers modulo the first modulus (q),
   wherein at least a portion of the shared matrix entries are integer polynomials and at least a portion of the shared pool entries are polynomials modulo the first modulus (q) and the reduction polynomial (f).

7. The first network node as in claim 1,
wherein at least a portion of the shared matrix entries are portioned into sets,
wherein each set a selection function maps at least part of the shared pool to the set in dependence on at least part of the selection parameter.

8. The first network node as in claim 7,
wherein the sets correspond to the rows or columns of the shared matrix (A), or
the sets correspond to blocks of the shared matrix (A), and/or
wherein the sets have equal size.

9. The first network node as in claim 1,
wherein a selection function takes as input a selection parameter and an index,
wherein the index indicates an entry or coefficient of an entry of the shared matrix (A),
wherein the selection function produces as output an index in the shared pool.

10. The first network node as in claim 1, wherein a selection function maps a consecutive sequence of shared pool entries, to a consecutive sequence of elements in a row or column of the shared matrix (A).

11. The first network node as in claim 1,
wherein a selection function dependent on a selection parameter r maps shared pool entries with index r up to (r+k−1) modulo the size of the shared pool to a row or column of the shared matrix (A),
wherein k is the dimension of the matrix.

12. The first electronic network node as in claim 1,
wherein the cryptographic operation is a key exchange (KEX) protocol,
wherein the processor circuit is configured to receive a public key matrix ($P_R$) of the second network node,
wherein the processor circuit is configured to compute a raw key as a matrix product between the received public key of the second node and the private key matrix ($S_I$) of the first network node,
wherein the first network node is configured to receive reconciliation data (h) of the second network node,
wherein the first network node is configured to compute a shared key by applying a reconciliation function (rec) to the received reconciliation data and the raw key, or
wherein the first network node is configured to obtain the shared key and reconciliation data from the raw key,
wherein the first network node is configured to send the reconciliation data to the second network node.

13. The first network node as in claim 1,
wherein at least a portion of the shared matrix entries are polynomials,
wherein the reduction polynomial (f) is $x^n+1$, or $x^n-1$, or $$\frac{x^n - 1}{x - 1}.$$

14. The first network node as in claim 1,
wherein the processor circuit is configured to compute an expanded shared matrix for shared matrix (A), by replacing polynomial entries of degree larger than 0, with a circulant matrix,
wherein the expanded shared matrix (A) has integers modulo the first modulus (q) as expanded shared matrix entries, and a number of columns and rows equal to the number of columns,
wherein rows of the shared matrix (A) times the degree of the reduction polynomial (f).

15. The first network node as in claim 1,
wherein adding noise to the matrix product comprises:
scaling at least a portion of the matrix product entries down to a second modulus (p),
wherein a scaled entry is equal to the unscaled entry multiplied with the second modulus (p), divided by the first modulus (q) and rounded to the nearest integer,
wherein the second modulus (p) is smaller than the first modulus (q),
wherein computing a raw key as a matrix product between the received public key of the second node and the private key matrix ($S_I$) of the first network node is modulo the second modulus.

16. The first network node as in claim 1, wherein
the private key matrix ($S_I$) is chosen uniformly random from candidate private key matrices, and/or
coefficients of elements in the private key matrix are bounded in absolute value by a bound, and/or
columns and/or rows of the private key matrix ($S_I$) have a fixed or bounded hamming weight ($h_s$).

17. The first network node as in claim 1,
wherein the shared matrix (A) has at least one dimension equal to k,
wherein the private key of the first node has dimensions n and $\bar{n}$,
wherein the private key of the second node has dimensions $\bar{m}$ and n,
wherein $\bar{n}$ and $\bar{m}$ are smaller than n.

18. The first network node as in claim 1,
wherein the processor circuit is configured to select all integers, polynomials, and/or polynomial-coefficients in the shared matrix (A) from the shared pool, or
wherein the processor circuit is configured to select part of the integers, polynomials, and/or polynomial-coefficients in the shared matrix (A) from the shared pool, and to generate the remaining part of the shared matrix (A), or
all integers, polynomials, and/or polynomial-coefficients in the shared matrix (A) from the shared pool, and to replace part of the integers, polynomials, and/or polynomial-coefficients in the shared matrix (A) according to a substitution function.

19. The first network node as in claim 1,
wherein at least a portion of the shared matrix shared matrix entries comprises polynomials,
wherein at least a portion of the shared pool entries comprises integers,
wherein the selection polynomials select polynomial-coefficients from the shared pool,
wherein the shared pool comprising fewer entries than the number of entries in the shared matrix (A) times the degree of the reduction polynomial (f) minus 1.

20. The first network node as in claim 1,
wherein a selection function dependent on selection parameters r and s maps at least a portion of the shared pool entries with index (r+Prf(s,j)) modulo the size of the shared pool to an entry with index j of a row or column of the shared matrix (A),
wherein Prf denotes a Pseudo random function taking s as a seed and index j as input.

21. The first electronic network node as in claim 1,
wherein the cryptographic operation is a key exchange (KEX) protocol, wherein the processor circuit is configured to receive a public key matrix ($P_R$) of the second network node, wherein the first network node is configured to obtain the shared key and reconciliation data from the raw key, wherein the first network node is configured to send the reconciliation data to the second network node.

22. The first network node as in claim 1, wherein adding noise to the matrix product comprises:

selecting noise elements for one or more or all elements in the matrix product from a noise distribution; and adding the noise elements to the one or more or all elements in the matrix product.

23. An electronic cryptographic operation method comprising:

arranging communication between a first network node and a second network node;

obtaining a shared matrix (A);

wherein the shared matrix is shared with the second network node through the communication interface circuit, wherein at least a portion of the shared matrix entries are integers polynomials, wherein obtaining the shared matrix (A) comprises:

obtaining one or more selection parameters, wherein the shared parameters are shared with the second network node; and selecting integers, polynomials, and/or polynomial-coefficients from a shared pool, wherein the shared pool is shared with the second network node, wherein the shared pool comprises multiple integers and/or polynomials for use as an entry of the shared matrix (A), wherein the selecting is done according to one or more selection functions, wherein a selection function assigns an integer, polynomial, and/or polynomial-coefficient from the shared pool to an entry in the shared matrix (A), wherein the particular integer, polynomial, or polynomial-coefficient assigned by a selection function is dependent on the selection parameter;

generating a private key matrix ($S_I$), wherein at least a portion of the private key entries in the private key matrix ($S_I$) are integers and/or integer polynomials; and generating a public key matrix ($P_I$) by computing a matrix product between the shared matrix (A) and the private key matrix ($S_I$) obtaining a matrix product;

adding noise to at least a portion of the matrix product entries; and sending the public key matrix of the first network node to the second network node.

24. A computer program stored on a non-transitory medium, wherein the computer program when executed on processor performs the method as claimed in claim 23.

* * * * *